US011270178B2

(12) United States Patent
Atkinson et al.

(10) Patent No.: US 11,270,178 B2
(45) Date of Patent: Mar. 8, 2022

(54) INTELLIGENT LABEL DEVICE AND METHOD

(71) Applicants: Paul Atkinson, Poway, CA (US);
James Kruest, San Diego, CA (US);
Anoop Agrawal, Tucson, AZ (US);
John P Cronin, Tucson, AZ (US); Lori L Adams, Tucson, AZ (US); Juan Carlos L Tonazzi, Tucson, AZ (US)

(72) Inventors: Paul Atkinson, Poway, CA (US);
James Kruest, San Diego, CA (US);
Anoop Agrawal, Tucson, AZ (US);
John P Cronin, Tucson, AZ (US); Lori L Adams, Tucson, AZ (US); Juan Carlos L Tonazzi, Tucson, AZ (US)

(*) Notice: Subject to any disclaimer, the term of this patent is extended or adjusted under 35 U.S.C. 154(b) by 0 days.

(21) Appl. No.: 15/880,795

(22) Filed: Jan. 26, 2018

(65) Prior Publication Data
US 2019/0236424 A1  Aug. 1, 2019

Related U.S. Application Data

(63) Continuation of application No. 15/268,942, filed on Sep. 19, 2016, now Pat. No. 9,996,779, which is a
(Continued)

(51) Int. Cl.
*G06K 19/07* (2006.01)
*G06K 7/10* (2006.01)
(Continued)

(52) U.S. Cl.
CPC ..... *G06K 19/0717* (2013.01); *G06K 7/10366* (2013.01); *G06K 19/06028* (2013.01);
(Continued)

(58) Field of Classification Search
CPC .......... G06K 19/0716; G06K 19/0717; G06K 19/0723; G06K 7/10366
(Continued)

(56) References Cited

U.S. PATENT DOCUMENTS

2004/0215409 A1* 10/2004 Adewole ............ G06K 19/0717
702/81
2011/0096388 A1* 4/2011 Agrawal ............... G02F 1/1506
359/268

* cited by examiner

*Primary Examiner* — Toan C Ly

(57) ABSTRACT

Briefly, an intelligent label is associated with a good, and includes one or more permanent and irreversible electrochromic indicators that are used to report the condition of that good at selected points in the movement or usage of that good. These electrochromic indicators provide immediate visual information regarding the status of the good without need to interrogate or communicate with the electronics or processor on the intelligent label. In this way, anyone in the shipping or use chain for the good, including the end user consumer, can quickly understand whether the product is meeting shipping and quality standards. If a product fails to meet shipping or quality standards, the particular point where the product failed can be quickly and easily identified, and information can be used to assure the consumer remains safe, while providing essential information for improving the shipping process. It will be understood that the label may take many forms, such as a tag attached to the good, integrated into the packaging for the good, integrated into the good itself, or may even be an information area on a prepaid card for example. The label may also include, for example, print information regarding the good, usage or shipping rules, or address and coded information.

48 Claims, 15 Drawing Sheets

Related U.S. Application Data continuation of application No. 14/479,055, filed on Sep. 5, 2014, now Pat. No. 9,471,862, which is a continuation-in-part of application No. 13/002,275, filed as application No. PCT/US2009/049644 on Dec. 30, 2010, now Pat. No. 9,030,724.

(60) Provisional application No. 62/025,045, filed on Jul. 16, 2014, provisional application No. 62/025,043, filed on Jul. 16, 2014, provisional application No. 61/975,112, filed on Apr. 4, 2014, provisional application No. 61/955,237, filed on Mar. 19, 2014, provisional application No. 61/955,236, filed on Mar. 19, 2014, provisional application No. 61/955,235, filed on Mar. 19, 2014, provisional application No. 61/922,060, filed on Dec. 30, 2013, provisional application No. 61/187,619, filed on Jun. 16, 2009, provisional application No. 61/168,421, filed on Apr. 10, 2009, provisional application No. 61/156,932, filed on Mar. 3, 2009, provisional application No. 61/109,691, filed on Oct. 30, 2008, provisional application No. 61/087,796, filed on Aug. 11, 2008, provisional application No. 61/078,328, filed on Jul. 3, 2008.

(51) Int. Cl.
*G06K 19/077* (2006.01)
*G06K 19/06* (2006.01)

(52) U.S. Cl.
CPC ..... *G06K 19/0702* (2013.01); *G06K 19/0723* (2013.01); *G06K 19/07707* (2013.01)

(58) Field of Classification Search
USPC ........................................................ 235/492
See application file for complete search history.

Example of Patterned Conductors

Representative ECD Cross Section

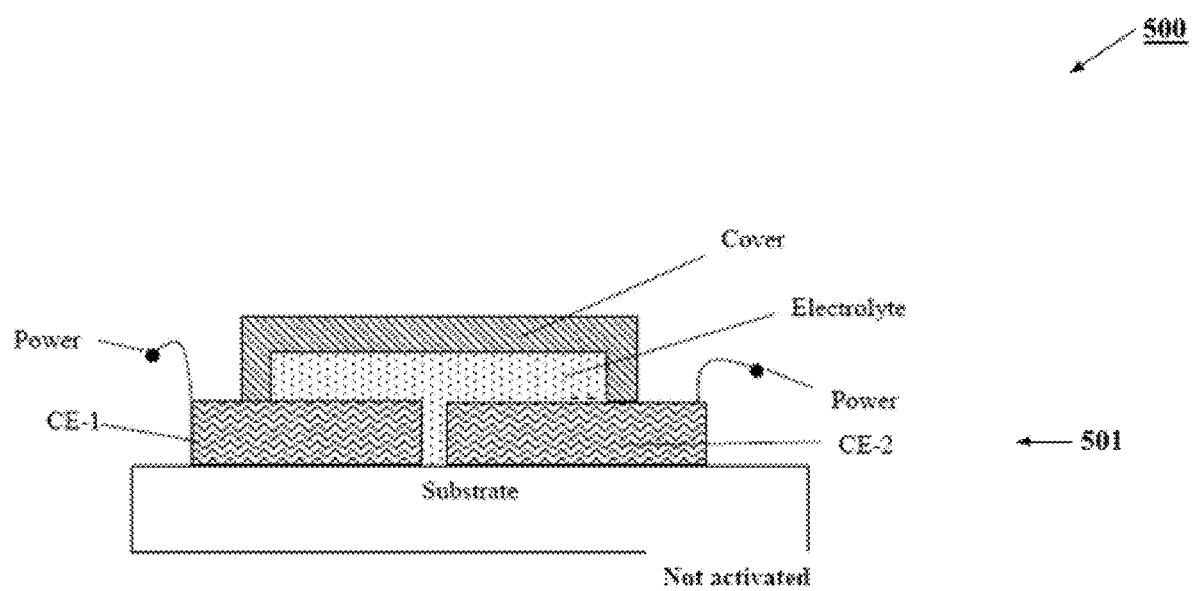
FIG. 14A
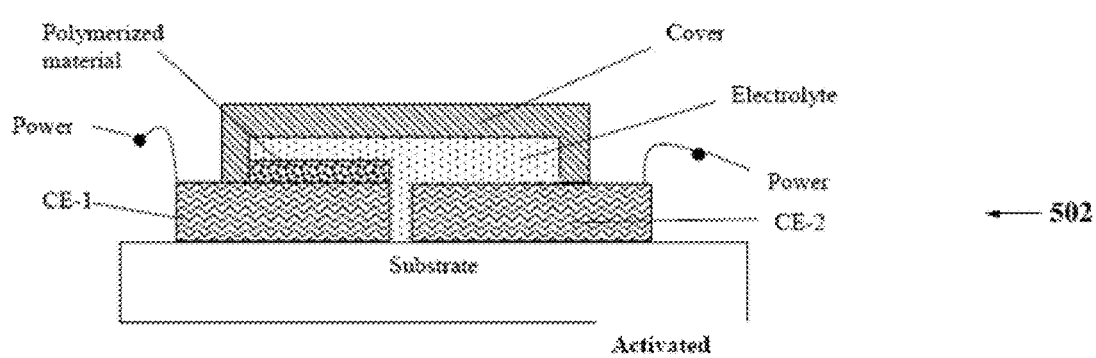
FIG. 14B
FIG. 14

INTELLIGENT LABEL DEVICE AND METHOD

RELATED APPLICATIONS

This application is a continuation of U.S. patent application Ser. No. 15/268,942, filed Sep. 19, 2016, which is a continuation of U.S. patent application Ser. No. 14/479,055, filed Sep. 5, 2014, and now issued as U.S. Pat. No. 9,471, 862, which claims priority to provisional application Ser. No. 61/922,060, filed Dec. 30, 2013; provisional application Ser. No. 61/955,235, filed Mar. 19, 2014; provisional application Ser. No. 61/955,236, filed Mar. 19, 2014; provisional application Ser. No. 61/955,237, Mar. 19, 2014; provisional application Ser. No. 61/975,112, filed Apr. 4, 2014; provisional application Ser. No. 62/025,043, filed Jul. 16, 2014; and provisional application Ser. No. 62/025,045, filed Jul. 16, 2014. This application is also a continuation-in-part to U.S. patent application Ser. No. 14/679,213, filed Apr. 6, 2015, which is a divisional application to U.S. patent application Ser. No. 13/002,275, Entitled Flexible and Printable Electrooptic Devices, filed on Dec. 30, 2010, now issued as U.S. Pat. No. 9,030,724, which claims priority to provisional application Ser. No. 61/078,328, filed on Jul. 3, 2008; provisional application Ser. No. 61/087,796, filed Aug. 11, 2008; provisional application Ser. No. 61/109,691 filed on Oct. 30, 2008; provisional application Ser. No. 61/156,932 filed on Mar. 3, 2009, provisional application Ser. No. 61/168,421 filed on Apr. 10, 2009 and provisional application Ser. No. 61/187,619 filed Jun. 16, 2009, which applications are incorporated by reference herein.

This application also claims priority to provisional application Ser. No. 61/922,060, filed Dec. 30, 2013; provisional application Ser. No. 61/955,235, filed Mar. 19, 2014; provisional application Ser. No. 61/955,236, filed Mar. 19, 2014; provisional application Ser. No. 61/955,237, Mar. 19, 2014; provisional application Ser. No. 61/975,112, filed Apr. 4, 2014; provisional application Ser. No. 62/025,043, filed Jul. 16, 2014; and provisional application Ser. No. 62/025, 045, filed Jul. 16, 2014; each of which is incorporated herein as if set forth in their entirety.

FIELD OF THE INVENTION

The present invention relates to an intelligent label that is particularly constructed to be associated with a good, and to enable trusted and verifiable reporting of the condition of that good. In one aspect, the label's processor is used to evaluate time or environmental conditions, and in response set or change a human-readable electrooptic indicator. In another aspect, the label includes a wireless radio to report additional information regarding the condition of the good.

BACKGROUND

Modern commerce is increasingly dependent on transporting goods using carriers as society embraces more and more online shopping. For example, modern consumers are increasingly using online shopping and common carriers for delivering wine, prescription medication, food, and sensitive electronic devices. To assist in tracking and monitoring the movement of sensitive and expensive goods, labels have been developed in the past that incorporate RFID communication and intelligence. In this way, at the point of shipment and throughout the major carriers, the good has the ability to be tracked. However, adoption of such RFID labels has been slow, as the equipment for initializing, loading, updating, and interrogating the label's RFID electronics is expensive, and typically only available at larger transfer points in the shipping transaction. Further, it is unlikely, and even rare, for the end consumer to be able to interact with the label. Since the consumer is a critical part of the delivery chain, and the consumer is excluded from participation in the information available on the label, the use of intelligent labels has been quite low and very ineffective in improving the customer experience.

SUMMARY OF THE INVENTION

An intelligent label is associated with a good, and includes one or more permanent and irreversible electrochromic indicators that are used to report the condition of that good at selected points in the movement or usage of that good. These electrochromic indicators provide immediate visual information regarding the status of the good without need to interrogate or communicate with the electronics or processor on the intelligent label. In this way, anyone in the shipping or use chain for the good, including the end user consumer, can quickly understand whether the product is meeting shipping and quality standards. If a product fails to meet shipping or quality standards, the particular point where the product failed can be quickly and easily identified, and information can be used to assure the consumer remains safe, while providing essential information for improving the shipping process. It will be understood that the label may take many forms, such as a tag attached to the good, integrated into the packaging for the good, integrated into the good itself, or may even be an information area on a prepaid card for example. The label may also include, for example, print information regarding the good, usage or shipping rules, or address and coded information.

In a particular construction, the intelligent label includes a computer processor for managing the overall electronic and communication processes on the intelligent label. For example, the processor controls any RFID communication, as well as storage of information data. The processor also has a clock, which may be used to accurately identify when the good changed hands in the shipping chain, or when the good failed to meet a quality standard. In this regard, the label may also have one or more sensors that can detect a chemical or gaseous composition, optical, electrical or an environmental condition such as temperature, humidity, altitude, or vibration. If the processor determines that the sensor has a condition that exceeds the safe handling characteristics, then the processor may store information regarding the out-of-specification handling, and may take additional actions as necessary. For example, if the out-of-specification handling is minimal, the processor may cause an electrooptical indicator such as an electrochromic indicator on the label to show a "caution" as to using the product. In another example, the processor may determine that the sensor has greatly exceeded the outer specification criteria, and cause an electrochromic indicator to show that the product is spoiled or otherwise unusable.

The intelligent label may also be constructed with an actuator that can robustly determine the time when the label was attached to the good. For example, the removal of the adhesive backing from a label may make or break an electronic circuit that causes the processor to identify the time when the label adhesive was removed or when the label was attached for shipping. In another example, the actuator can determine when a shipping package was sealed for shipping. Since this action necessarily happens within moments of the label being attached to the good, there is an accurate and traceable time as to when the good was placed by the shipper into the shipping chain. Thereafter, RFID communications may be used to retrieve and load additional information with the label, in order to track the good through the shipping chain.

Advantageously, the intelligent label provides a robust, trustworthy, easily usable system for tracking goods from a point of origin to delivery to the consumer. Importantly, the intelligent label provides important visual feedback throughout the shipping process without the need for expensive communication, RFID, or interrogation equipment. Further, the intelligent label facilitates simple and reliable communication of shipping information from a consumer back to a manufacturer or seller, for example, for confirming warranty or replacement information. In this way, a shipping and delivery system having a high degree of trust, and resistance to fraud, is enabled.

BRIEF DESCRIPTION OF THE DRAWINGS

FIGS. 14a-b are schematic illustrations of an EC indicator in the nonactivated and the activated states in accordance with the present invention.

DETAILED DESCRIPTION OF THE PREFERRED EMBODIMENT

Figure 1:
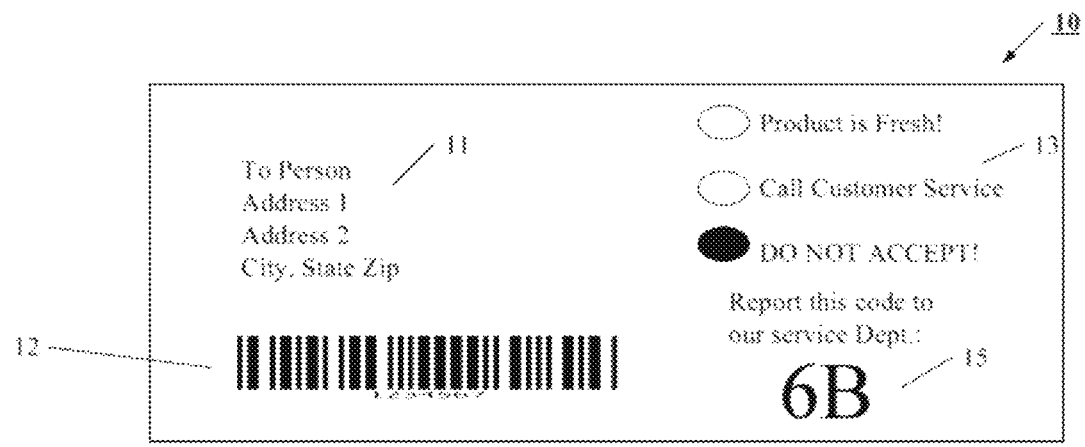
FIG. 1 is an illustration of the front side of an intelligent label made in accordance with the present invention.

The intelligent label may take many forms, such as a traditional style label for attachment to a discrete box or package, it may be integrally formed on a package such as a shipping container or mailer, or it may take the form of documentation that accompanies a shipped product. In other examples, the label may be integrated or applied on prepaid gift cards for example, or can be integrated into the good itself. Generally, the intelligent label is intended to enable a highly trusted, robust, and accurate way for safely and securely confirming or reporting the condition of a good, for example, as the good is transported from a point of origin to a consumer, or as it is held in stock prior to use. Additionally, the smart label enables analytics and an understanding of the quality and handling of the good over time that is not available with prior systems. Further, the intelligent label provides accurate and timely information to various participants in the handling and use process, including the end consumer, without the need for sophisticated processing, communication, or interrogation systems. In this regard, the intelligent label has a simple electrooptical display (indicator) for visually presenting selected important information about the quality and handling of the good. A preferred option is an irreversible bistable indicator that cannot be turned back to its original state electronically, and thus is naturally resistant to tampering or accidental alteration. In some labels one may use both bistable and irreversible indicators corresponding to different indicator functions.

Bistable indicators may be used to temporarily reveal a code or information. Bistability means that the display or the indicator changes from a first optical state to a second optical state by using a powering protocol, and remains in the second optical state without the application of additional power. However, this state (the second optical state) can be reversed to the first optical state by applying a different powering protocol and can also be maintained in that state without application of the power. The length of stability in a given optical state is dependent on the application requirement and a suitable electrooptical display/indicating system meeting that requirement can selected. In some applications optical state stability without the application of power, on the order of a few minutes may be acceptable, while in other cases this may extend to several days, months or years. Many non-emissive electrooptical systems such as electrophoretic, liquid crystal and electrochromic systems can be tailored for various bistability requirements. Another desirable property of these indicators is their environmental durability (time, temperature, humidity (moisture), pressure and radiation (e.g., UV) in both activated and non-activated states so that it is obvious from visually observing the indicator its last state of activation (or inactivation). This environmental stability ensures that it would be difficult to mistake the conveyance of its intended optical state and also difficult to tamper with and also results in a permanence of indicated information.

A preferred electrooptical device is an electrochromic (EC) indicator, and more preferably an irreversible EC indicator (or device). It is expected that the shelf life of these displays in activated and non-activated states will be at least one year under normal ambient conditions, and preferably more than 3 years, and most preferably 5 years. For example, the electrooptical device may indicate an expiration of time in the shipping process, may indicate that the good was subjected to extreme environmental conditions, or may indicate that the product was good and reliable for use. It will be appreciated that the intelligent label has many varied applications for enabling advantageous shipping processes.

The Intelligent Label

Referring now to FIG. 1, one example of an intelligent label is illustrated. It will be appreciated that the intelligent label may take many forms, however the form illustrated is a fairly typical label for attachment to a good destined for shipment using carriers or delivery company. In other examples, the label may be integrated into mailers or other shipping containers, may be part of shipping documentation, or may be integrated with the product or good itself, as in the case of a gift card. Referring again to FIG. 1, label 10 is intended for attachment to a good using an adhesive backing. As with a traditional paper label, intelligent label 10 has a print area 11 that may be used for identifying the intended receiver for the good. It will be appreciated that the print area may contain many other kinds of information, such as additional information regarding the attached good, invoice numbers, purchase order numbers, and additional information to assist the shipper. It will be appreciated that the print information may be placed in many different areas in human-readable or machine-readable form. For example, the print area may include barcode or other man or machine readable 12 to facilitate a more automated way to track process through the shipping chain. The intelligent label 10 also has embedded electronics that enable wireless communication to and from the intelligent label 10 electronics, not visible from the front of label 10, including a power source such as a battery, a processor, memory, and wireless communication, typically in the form of an RFID communication processor. It will be appreciated that these functions may be integrated onto a single electronic device, or maybe discreetly implemented. Accordingly, besides the tracking information that may be acquired from the print area 11, additional tracking information may be stored and communicated using the electronic RFID areas. The intelligent label may also have an optional power harvester to charge the onboard power source such as a capacitor or a battery. The power harvester may produce electric energy from light (e.g., solar cell), RF energy, or due to motion and vibration that the label is subjected to.

Intelligent label 10 typically has an actuator, not illustrated from the front, that activates the electronics in the label just prior to the label being attached to the good. For example, the label may have adhesive backing, that when removed, enables the capture of the particular date and time when the label is being attached to the good. To enable this, the processor would operate in a very low power state to maintain its timer, and then when the adhesive is removed from the back of the label, a higher power mode would be enabled that allowed capture and storage of the current time and day. In this way, the label itself can accurately capture when it is attached to a good in-service. The good may then be placed into the shipping chain, where at each transfer information may be captured from the label using the barcode 12 or from the electronic RFID communications, and additional information may be stored in the RFID areas as well, provided such RFID equipment is available at shipping locations.

Intelligent label 10 also has an electrochromic display area 13 for providing immediate visual information regarding the quality of the product without the need for interrogating the RFID communication system. In one example, the processor in the intelligent label 10 contains rules as to how long the shipping process should take. In a more specific example, the label 10 could be applied to a box of flowers. The shipper-grower may require that the flowers be delivered within a two day time span. As soon as the label is applied to the flowers, the timer starts and begins counting the elapsed time that the flowers have been in the shipping process. Initially, the intelligent product label may indicate the flowers as being fresh, but if the shipping time goes behind the limits set in the rules, the processor may cause the electrochromic device to indicate not to accept the flowers. Thus, at any point in the shipping process the receiver would be put on visual notification not to accept the flowers. This point could be at the end consumer point, or could be at any other point in the shipping chain. In one interesting alternative, there could be a period of time when the product is not quite fresh, but yet would be acceptable by most consumers. In this case, the intelligent label could be set up to inform the end-user to call customer service. Upon calling customer service, the customer may be offered a discount or other incentive to accept the flowers, acknowledging that they are nearing the end of their freshness state.

In a more specific example of the electrochromic display, the electrochromic display may have an informational block 15 for providing additional specific information. The information in informational block 15 may provide coded information depending upon specific attributes of the shipping process. Typically, the informational block 15 would be activated in order to give more specific information as to the broad information given in area 13. For example, the intelligent label 10 shows that the product associated with this label should not be accepted. If, for example, a consumer removes a package from their mailbox with the "do not accept" highlighted, the consumer typically will not have the equipment necessary to interrogate the label through its RFID communication channels. However, at the time the "do not accept" electrochromic indicator was set, the label also provided an electrochromic indication that provided the additional information as shown in information block 15. Accordingly, when the consumer calls customer support for the provider of the good, the consumer can visually read the code included in block 15 to the customer service representative, and that particular code can be associated with a specific time or event causing the good to go bad. In this way, customer service obtains significant information that is accurate and trustworthy as to where in the shipping chain the product was mishandled. By providing such information, the chances for fraud are decreased, and the opportunity for improved customer service is enabled.

Label Construction

It will be appreciated that the intelligent label may take many forms, but for convenience, the structure and function of the intelligent label will be described with reference to a discrete label having an adhesive backing for attachment to a mailing package or good. It will be understood that other constructions for the intelligent label are consistent with this disclosure, such as a label integrated with a package, integrated onto shipping packaging, or integrated into shipping documentation. It will also be appreciated that other constructions or possible consistent with this disclosure.

Figure 2:
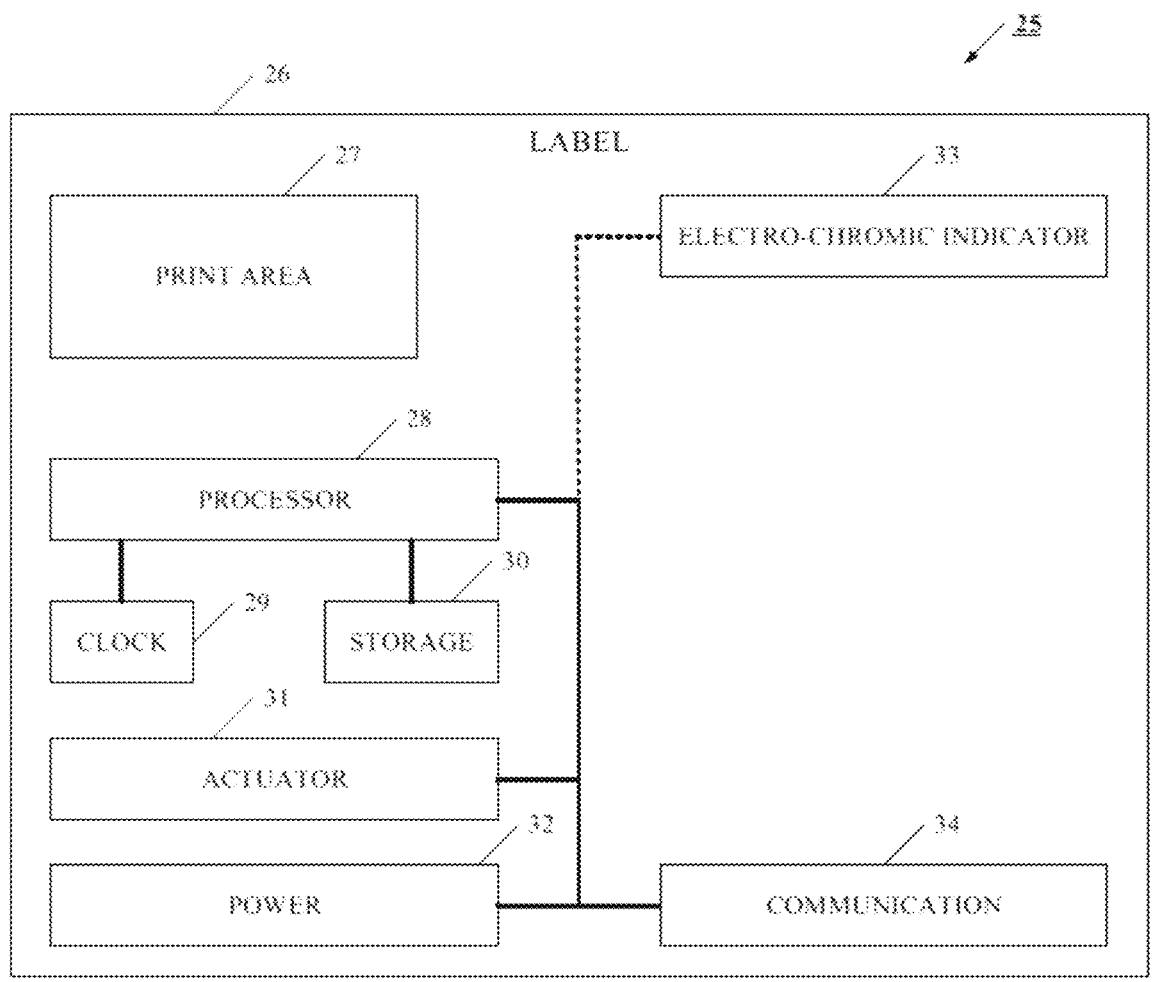
FIG. 2 is a block diagram of an intelligent label made in accordance with the present invention.

Print Information. Referring now to FIG. 2, an example construction for an intelligent label 25 is illustrated. Intelligent label 25 typically has a front side, which has a print area 27 for communicating information regarding the good itself or the shipping and usage of that good. The information typically is printed onto the label using inkjet or laser printing processes, or may be preprinted. The print information may contain such information as name, address, invoice number, preferred shipper, and other traditional shipping information. Print information may also include information about the use of the goods, or rules regarding how the good should be stored or shipped. The print information may include textual information, as well as barcode or other types of machine readable formats. In this way, the print information can assist a human reading the information, and also may accommodate more automated data collection processes throughout the shipping chain.

Processor. Intelligent label 25 also has electronics on or embedded within its structure. Electronics includes a processor 28 having an associated clock 29 and storage 30. The processor also manages communication using communication processor 34, which typically is an RFID radio. It will be appreciated that the various electronic components may be implemented using a single integrated circuit device, or may require multiple devices.

Electrochromic Indicator. Also on the front side of the label, there will be an electrochromic indicator 33 for providing additional information regarding the condition or quality of the good. Importantly, the electrochromic indicator 33 is bi-stable or permanent, i.e., irreversible. More particularly, the electrochromic material is specifically formulated and activated in a way that it has two color or transparency states, with the electrochromic material remaining in the first state until it is activated to transition to the second state. Once electrically transitioned to the second state by the processor, the process is irreversible, and the electrochromic device 33 remains permanently in the second color or the second transparency state. The particular formulation of the electrochromic material is fully set forth in published US patent application number 20110096388, which is incorporated herein in its entirety.

In one example, electrochromic indicator 33 may be a first color while in the first state, and then when transitioned to the second state, visually present a second color. In another example, the electrochromic indicator may change its transparency state. In this way, electrochromic indicator could be placed over printed information that would not be visible while the indicator is in the first state, but then when transitioned, information below could be viewed through the now transparent electrochromic indicator. In another example, the electrochromic indicator 33 may be more complex and structured in a way that can build textual or numeric information, for example, such as using a segment or dot-based character construction. Further, although the electrochromic indicator is described as having only two states, it will be appreciated that some indicators may have more than two stable states. In another variation, upon activation, the electrochromic indicator may transition from a first state to a second state irreversibly, and then upon further activation transitions reversibly between the second and a third state, i.e., show bistability between the second and the third states.

In operation, electrochromic indicator 33 would be transitioned according to rules set in the processor for the particular good that is being shipped. These rules would be implemented using processor 28, and when a rule is satisfied, the processor 28 would cause an appropriate electronic signal to transition the electrochromic material in the electrochromic indicator 33. For example, rules may be set that would cause the electrochromic indicator 33 to indicate whether or not the package was shipped and delivered within the allotted time.

Power. The electronics for intelligent label 25 require a power source 32 for operation, communication, and transitioning the electrochromic indicator 33. This power may be supplied, for example, by a traditional primary or a secondary cell battery, a set of thin-film layers constructed as a battery, capacitor, or may be an antenna structure constructed to generate power responsive to an RFID field signal.

Communication. Bidirectional communication may be provided with intelligent label 25 using the communication processor 34. The communication processor 34 may be an RFID radio, although other radios such as ZigBee, 802.11, or Bluetooth maybe used. The communication processes on communication block 34 may be controlled by processor 28, with processor 28 managing what information is sent and received through the radio. Once information is received, it may be stored in storage 30, or rules may be applied to determine if action needs to be taken, such as setting the electrochromic indicator 33.

Actuator. Intelligent label 25 also has an actuator 31 for determining when the label is being attached to a good, for example. In this way, the actuator provides an accurate indicator of when the good is entering the shipping chain. It will be appreciated that the electronics man be activated at other trusted and confirmable times depending on the specific application. Actuator 31 can take many forms, depending upon the physical structure of the intelligent label 25. In one example, the actuator 31 is constructed along with the backing of the label, such as when the backing is removed to expose adhesive, the processor is provided with a signal that the label is about to be attached to the good. In this way, the processor can then store the accurate information regarding how the product entered the shipping chain, which can provide useful and accurate comparison information throughout the shipping process. In practice, the actuator can be implemented in many alternative ways. For example, the actuator may be set such that the removal of the label backing breaks an electronic circuit that can be detected by the processor. In another example, the removing of the backing material and placement of the label on the good may close a circuit, thereby giving a signal to the processor that the label has been attached to the good. In other examples, the actuator may be pressure activated through the application process, or provide an electronic signal that is generated by some physical action, such as by pulling a tab. It will be appreciated that actuator 31 maybe implement it in a wide variety of ways.

Figure 3:
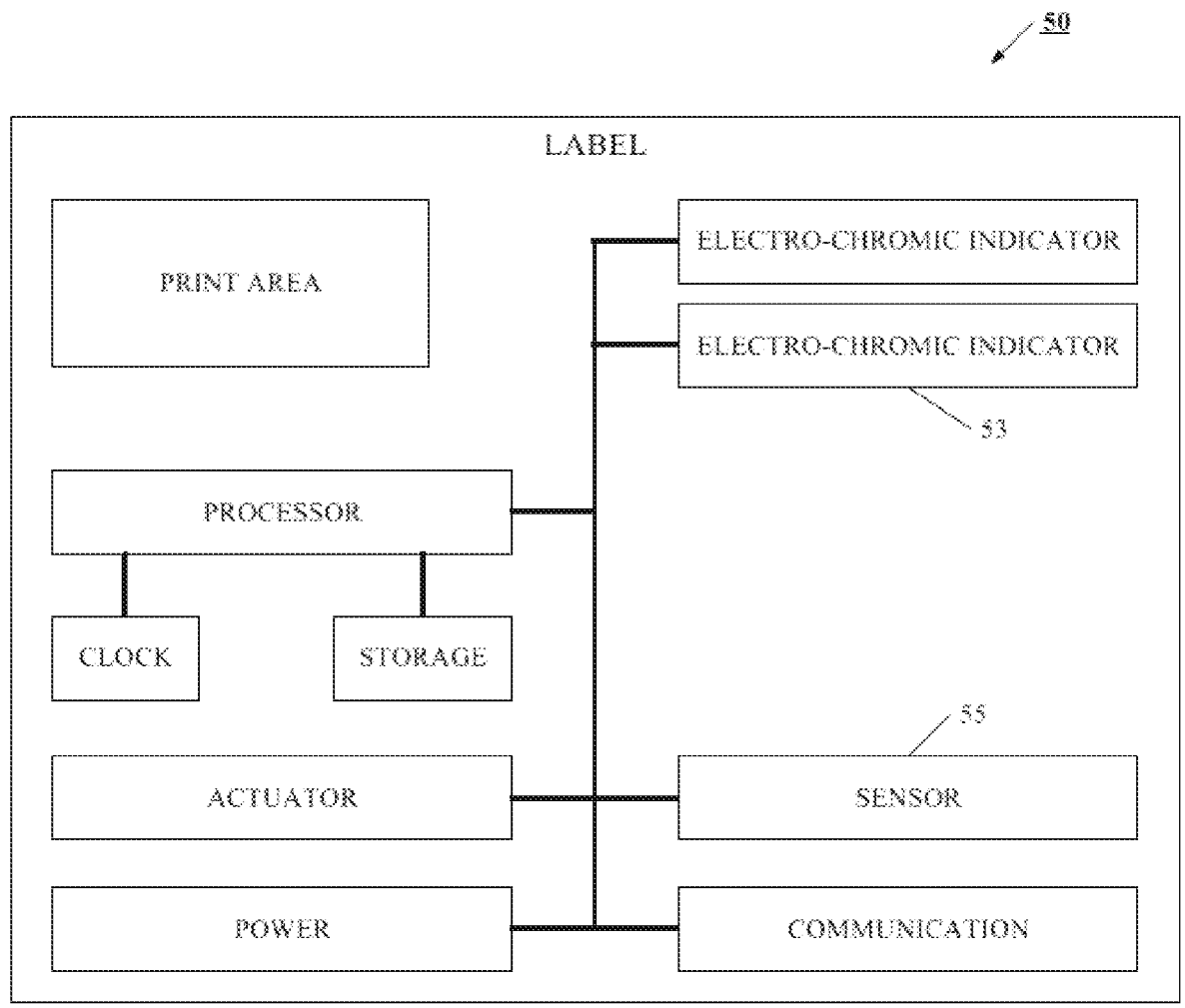
FIG. 3 is a block diagram of an intelligent label made in accordance with the present invention.

Sensor. Referring now to FIG. 3, another example of an intelligent label 50 is illustrated. Intelligent label 50 is similar to intelligent label 25 described with reference to FIG. 2, so only the differences will be described. For example intelligent label 50 includes a print area, processor, clock, storage, actuator, power, communication, and a first elected electrochromic indicator as set out with reference to intelligent label 25. However, intelligent label 50 has a sensor 55 that is positioned on, in, or below the intelligent label 50 for sensing something about the physical or chemical environment that the good was subjected to during the shipping process. By way of example, sensor 55 could be a temperature sensor, a humidity sensor, and altitude sensor, a pressure sensor, an optical sensor, a vibration sensor (including a shock sensor), a humidity sensor, biological or a chemical sensor (including a gas sensor, a pH sensor), a magnetic sensor, an a smoke sensor, etc. It will be appreciated that a wide variety of sensors could be used depending upon the particular good being sold. It will also be appreciated that although only one sensor is shown on intelligent label 50, multiple sensors may be used. For example, a sensitive electronic device may be sensitive to vibration so a vibration sensor would be used, and may have parts that cannot be exposed to temperature extremes, so a temperature sensor would also be provided. However, for convenience intelligent label 50 will be described with reference to a single sensor 55.

The processor within intelligent label 50 will have a set of associated rules for the expected environmental conditions that the sensor 55 should be exposed to these rules can be set to simplistically monitor the sensor data, or may contain more sophisticated algorithms as to allowable conditions. For example, a good may remain in a quality state if exposed to a temperature for a short period of time, but would be considered out of specification if the temperature remained for more than a set period of time. It will be appreciated that a wide variety of rules may be set for sensor 55.

With the addition of one or more sensors, it is likely that the intelligent label 50 will need at least one more electrochromic indicator 53. It will be appreciated that several electrochromic indicators and even of different types may be useful depending upon the number of sensors and sophistication of the rules for the good associated with intelligent label 50. In one example, an electrochromic indicator may be provided for visually indicating the letter, character, or code that provides more information regarding when or why the good was deemed to be unacceptable. Again, as the electrochromic indicator provides a human readable visual indicator, a person, such as the end consumer, would not need to wirelessly interact with the intelligent label 50 to obtain meaningful information regarding the state transition. In this way, a customer service representative interacting with the consumer would be able to not only verify that the consumer's product has been indicated to be a bad quality, it may be able to determine additional specific information that could improve the shipping process, and provide valuable information in satisfying the customer's needs.

Figure 4:
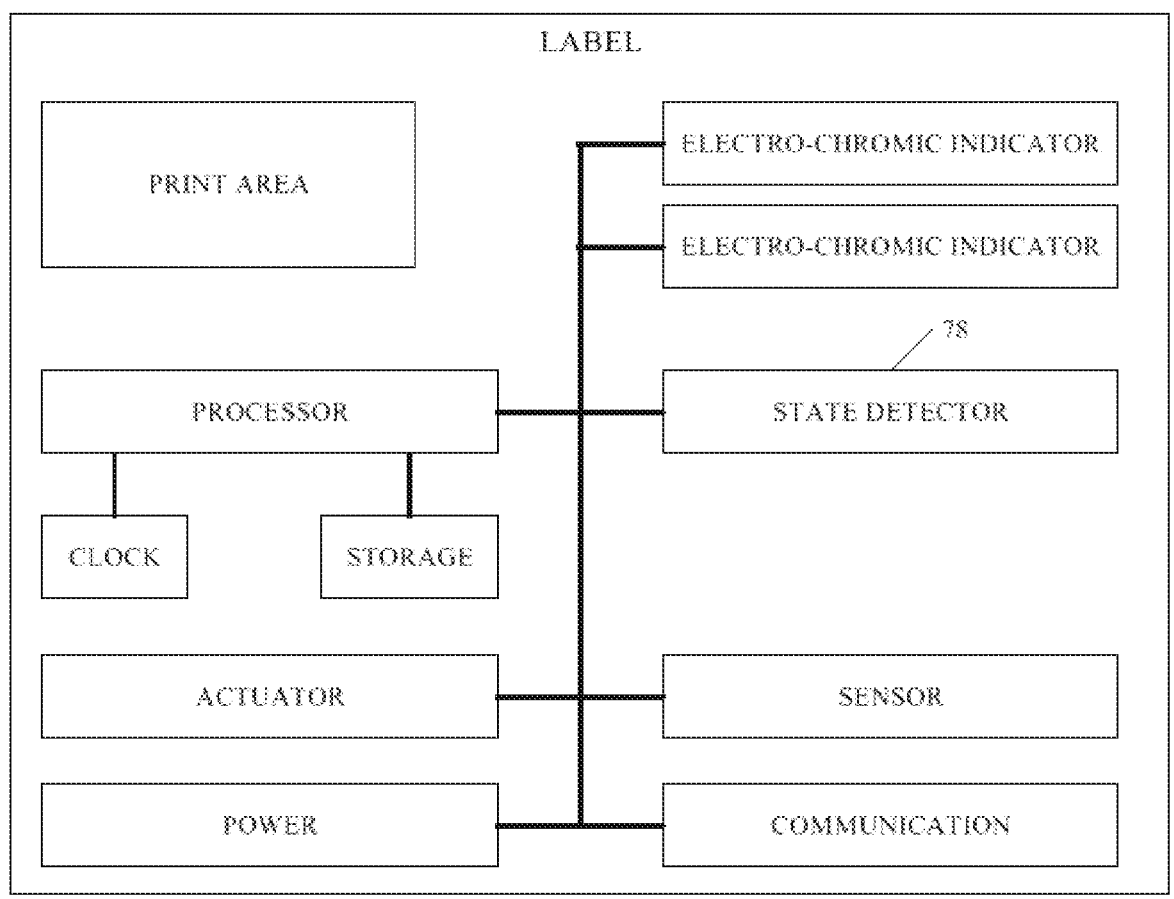
FIG. 4 is a block diagram of an intelligent label made in accordance with the present invention.

State Verification. In some cases, particularly with high value goods, it may be desirable to add another layer of protection that the electrochromic indicator has properly transitioned to its second state. Referring now to FIG. 4, another example of an intelligent label 75 is illustrated. Intelligent label 75 is similar to intelligent label 50 described with reference to FIG. 3, so only the differences will be described. For example, as shown in FIG. 4, the state detector 78 may be connected to one or more of the electrochromic indicators. In this way, when a particular rule is set to change one or more electrochromic indicators, the processor will provide the required power signal to the electrochromic indicator for it to change to its permanent second state. After an appropriate period of time, the processor can then cause state detector 78 to confirm that the electrochromic material has changed dates. This can be done, for example, using electrical measurements across the electrochromic indicator, or using optical sensors for physically detecting color, transparency, or opaqueness of the electrical material. In this way, the processor would not only track when it intended to set the electrochromic material into its second state, but would provide further verification information that the state was actually changed. The reliability of the state detection and confirmation may be further improved using knowledge of environmental conditions such as temperature, altitude, number of indicators, and their size, so that electrical parameters of the indicators are accurately predicted and tested both before and after activation.

Figure 5:
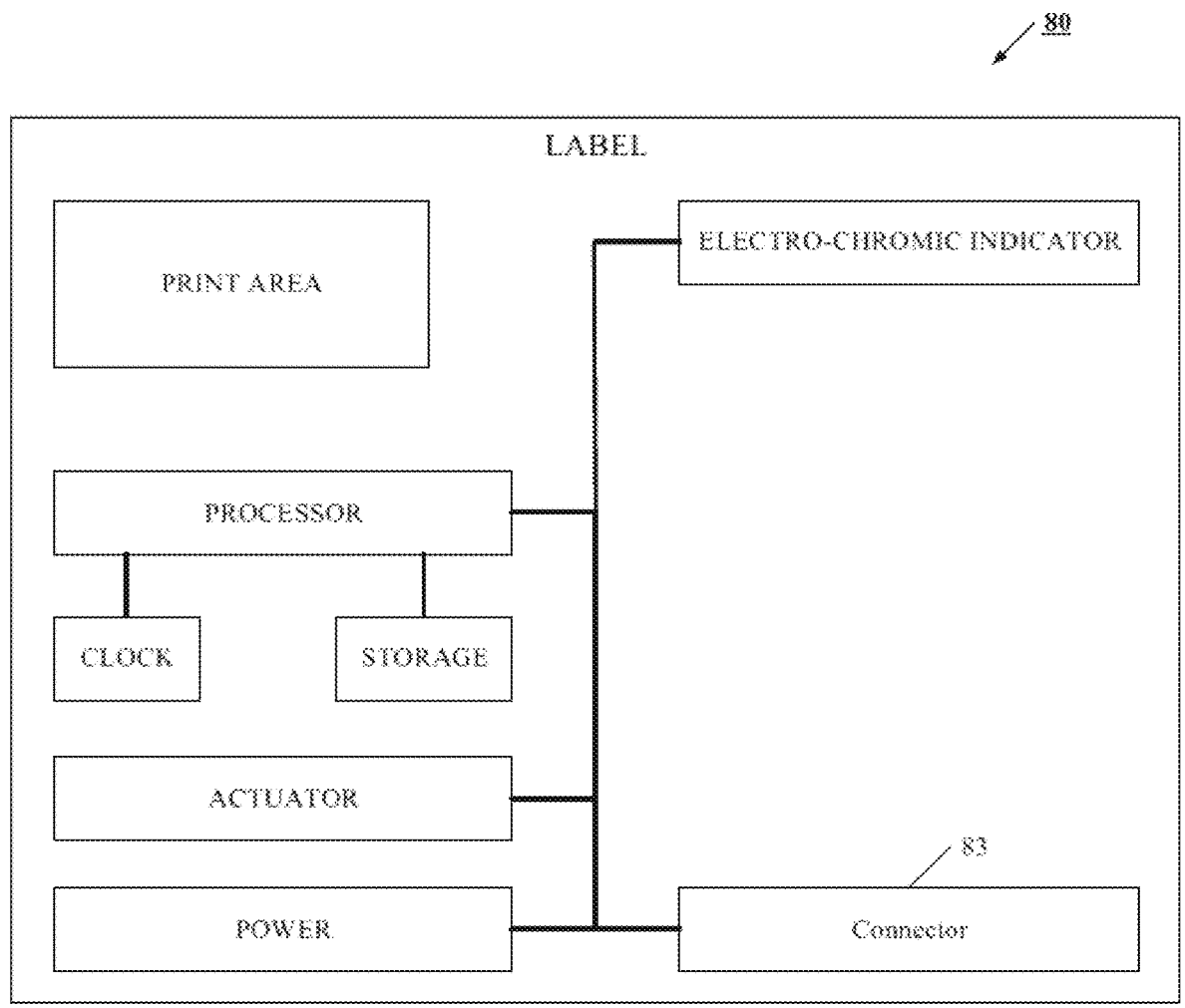
FIG. 5 is a block diagram of an intelligent label made in accordance with the present invention.

Referring now to FIG. 5, another example of the intelligent label 80 is illustrated. Intelligent label 80 is similar to intelligent label 25 discussed with reference to FIG. 1, so only the differences will be described. Intelligent label 80 does not have a wireless communication capability, so is simpler and less expensive to manufacture, but still enables advantageous and trusted commercial transactions.

The Electro-Optic Indicator

The electro-optic indicator may be implemented using alternative material and construction approaches. However, for many applications, it is highly desirable that the electro-optic indicator be inexpensively constructed, for example, by using a limited number of layering or manufacturing steps. To this end, an electrochromic (EC) material for the display indicator, comprising an electrochromic thin-film chemistry, is disclosed in U.S. patent application Ser. No. 13/002,275 ("Flexible and Printable Electro-Optic Devices"), which is incorporated herein in its entirety. The disclosed electrochromic material is particularly suitable for forming a low-cost, low-power display and indicator. The visual properties of the resulting electrochromic indicator change upon being energized by a voltage source such as a coin cell or a thin-film battery or a capacitor, or 'harvested' from solar or RF radiation, or vibrations where the harvested energy may be used to charge the said battery or a capacitor. In practice, it is desired to maximize the change in visual properties, such as contrast, color, pattern, or other visual property, between the first unactivated state and the second activated state, while minimizing the power and time needed to complete the switching between the states.

Figure 8:
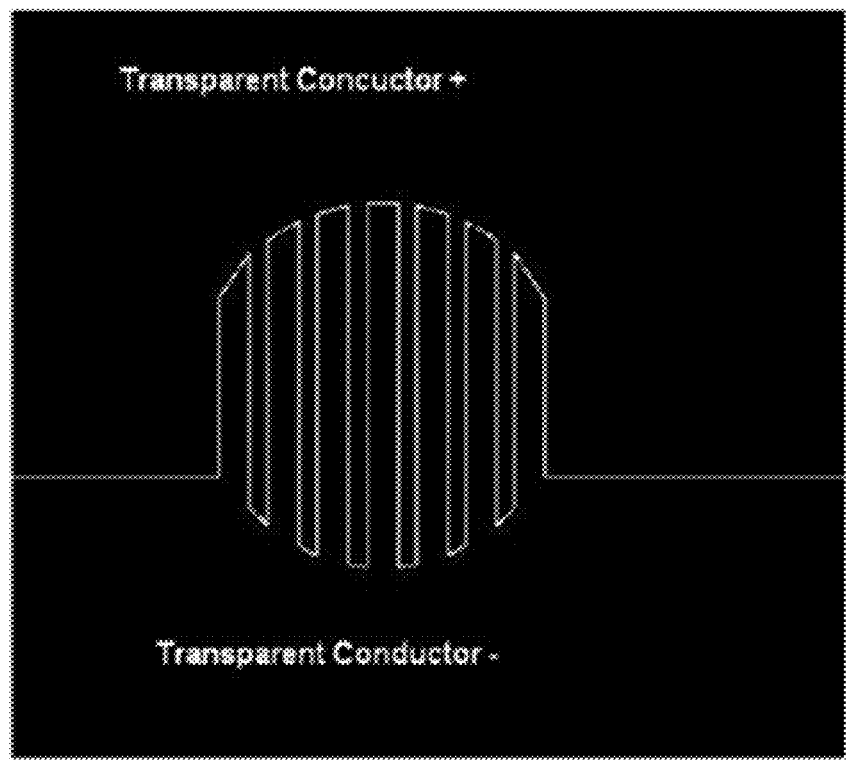
FIG. 8 is a diagram of using patterned conductors for a transparent electrochromic material.

As shown in FIG. 8, the electrochromic indicator may be constructed to have a substrate such as a polymer plastic, PET, or other, onto which a transparent conductor, i.e. indium tin oxide (ITO) or PEDOT, is deposited and patterned to form a visual design and electrically isolated areas (forming at least two opposing electrodes), and an applied layer of electrolyte. Alternatively, another conductive layer, patterned or not, is applied on top of the electrolyte, to form an opposing electrode to the one (or the ones) formed on the substrate.

Figure 9:
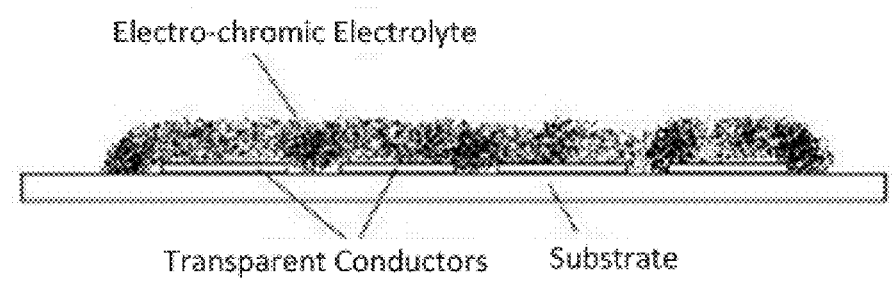
FIG. 9 is a diagram of a cross-section of a electrochromatic indicator having a pattern of transparent conductors.
Figure 10:
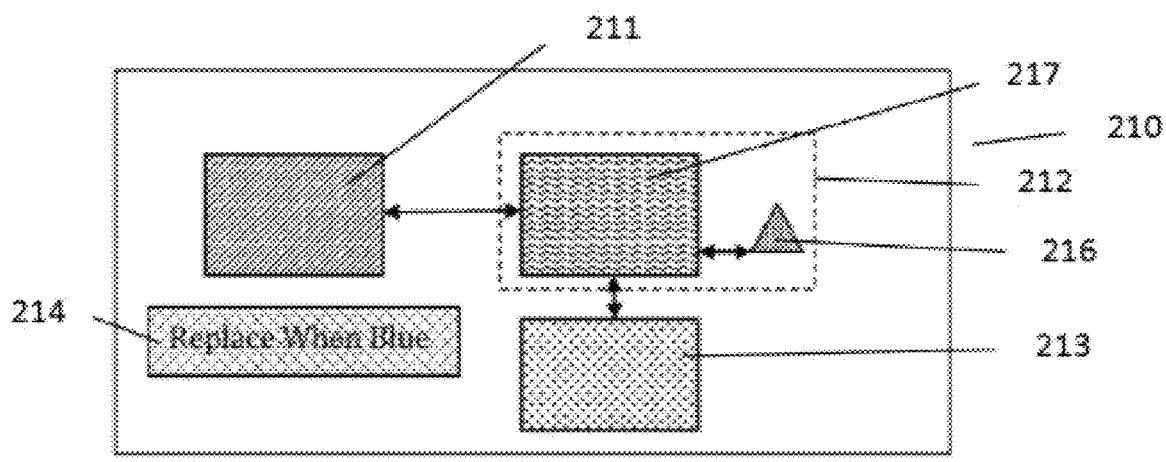
FIG. 10 is a block diagram of an intelligent label made in accordance with the present invention.

In one example shown in FIG. 9, the electrochromic indicator comprises a patterned conductive layer (electrodes) and an electrolyte layer comprising in part an electrochromic material, typically disposed on a suitable substrate. The substrate may provide the mechanical support for conductors and electrolyte layers; alternatively the conductors and electrolyte layers may be formed on a companion device such as an RFID tag, identification card, or circuit board.

The conductive layer may be formed and patterned by mechanically or chemically etching or may be formed by laser ablation a predisposed conductive layer. Examples of transparent conductive layers are ITO, PEDOT or other suitable material. Mechanical etching is done by machining the conductive layer. One way this is carried out on polymeric substrate is by using a sharp blade which punctures through the conductive layer and can be mechanically driven to form a pattern and breaking the conductive path as desired. This mechanical scribing method of making patterns on flexible substrates is novel. The conductive coatings can be scribed using very inexpensive equipment and is a green process as it does not use chemical processes for etching. The pressure on the blade could be varied to change the penetration (if any) of the blade into the substrate. Alternatively the conductive layer (including non-transparent conductors) may be formed by printing techniques such as screen or pad printing. In this case one may use substrates which are not transparent, such as paper, cardboard, opaque polymeric films. The electrolyte layer may be applied using printing techniques such as screen, pad or ink-jet. The electrolyte may be applied in the form of a solid pattern or shape, or patterned so as to form, along with the patterned conductors, unique visual effects. When all the layers are formed by printing, then the technology lends itself to low cost label fabrication. Thus, it is also highly desirable to minimize the number of layers in the indicator, to ensure that the costs are low. In one highly preferable format the opposing conductive electrodes are printed on the substrate, and the electrooptical medium (e.g., for electrochromic devices, electrolyte comprising the electrochromic materials) is deposited on top of these opposing electrodes, thereby forming the indicator with only two layers (see FIG. 9 for a two layer device, where the opposing electrodes are the alternating transparent conducting pixels, and the electrolyte comprises of electrochromic materials). The structure may be sealed with a suitable cover layer. Applying a voltage across the opposing electrodes, causes the electrochromic device to undergo electrochemical reactions resulting in a visual change. If the electrolyte is opaque and the conducting electrodes transparent, the visual change is observed through the substrate. In case the conductive electrodes are not transparent (e.g., metallic and may even be deposited on an opaque substrate), then one can use a transparent electrolyte to be able to see the changes when viewing through the electrolyte.

Described herein are methods and techniques for enhancing the performance of electrochromic (ECD) indicators for improved performance to enable the practical invitation of an intelligent label by: achieving faster activation, and improving color, contrast, and visual distinction. An electrochromic indicator displays a visual change between unactivated and activated states. It is desirable to enhance this contrast through preferred activation techniques that involve one or more among: the length of time that the power source is applied; the number of times the power is applied and its polarity; the spacing between adjacent electrodes; the width, shape and conductivity of the electrodes; asymmetry in the widths and spacing of electrodes; the thickness and constitution of the electrolyte; the voltage slew rate of the applied power; current limiting and control of applied power; the formation of leakage paths between electrodes effecting a short or partial (resistive) short after removal of applied power; specific voltage of applied power.

Additionally, the method of activation and its variations thereof give rise to corresponding various visual effects which may be used as means for distinguishing authorized from un-authorized activity, e.g. for authenticating a valid event. In one example, a suitable voltage, e.g. 3V, is applied across the electrochromic material for a brief period, e.g. <1 second, initiating an electrochemical reaction at the electrodes resulting in a visual change, e.g. its color. Additionally a reversal of the voltage polarity for a second period, e.g. >1 second, initiates an electrochemical reaction resulting in further visual change. The sequence of a first applied voltage polarity and one or more subsequent reversals of voltage polarity advantageously achieve one of multiple desired changes in the visual properties of the ECD. The specific voltage, times for applying each polarity may be adjusted and optimized to achieve a specific desired visual effect.

The voltage required for activation may be supplied by a coin cell battery, thin-film battery, solar cell, thermopile, mechanical vibration, or other power source. Alternatively the power required for activation may be derived from an incident radio frequency emission, such as from an RFID reader. Energy from the reader is harvested by an RFID chip, an RFID chip associated with a processor, or by a circuit dedicated within or alongside a processor to receive such RF energy, rectified and regulated within the chip, and used to switch the electrochromic indicator. The RF energy may be at the same frequency as the reader's, or may be at a different frequency and transmitted concurrently with the reader's. In this case the energizing frequency and power levels may be optimized for the electrochromic indicator separately from the communication between reader an RFID chip or processor.

Following the activation of the electrochromic indicator as described above, it may be further advantageous to provide an electrically conductive path, e.g. a short circuit or partial short circuit, across the electrochromic indicator or a separate resistive path to facilitate the completion of the electrochromic reaction or further modify the contrast or visual effect. In a preferred embodiment the desired resistance is simultaneously fabricated as part of the etched or laser-ablated pattern in the conductive layer. Resistance may be in the range of less than 1,000 to greater than 5,000 ohms. Alternatively the resistance may be internal to the processor.

An additional modification to the activation method comprises applying multiple (one or more) activation cycles, with each additional cycle further enhancing the contrast and modifying the resulting visual effect. Further advantages can be obtained by controlling the application of the voltage, such as altering the rise and fall times, i.e. the slew rate; the value of the applied voltage including time period for application of this voltage; and by limiting the peak currents. Contrast between the before-and-after states depends also on the physical design of the electrochromic indicator, that is, on the geometries and dimensions of the underlying conductors and the thickness and application technique of the electrolyte. In a preferred design the conducting 'digits' (fingers) forming the display are advantageously wider, being in the range of 125 to 250 microns than the spaces between them, being less than 100 microns. Dimensions greater than or less than these values, including asymmetry in the alternating digits and spacing widths, may also be utilized to produce specific visual enhancements and variations.

Further variations in visual effects may be introduced by patterning the electrolyte material, so that in combination with the patterned conductors a diversity of unique visual effects may be realized. One example, an electrochromic indicator is incorporated into a wireless device, such as an RFID card or tag. RFID cards and tags are commonly available in many formats and compliant with industry standards, e.g. ISO 18000-C (also known as EPC Gen2). Other wireless technologies may also be used, such as Blue Tooth, Blue Tooth Low Energy, ZigBee, or any of various Wi-Fi or proprietary protocols and frequencies. RFID tags with an ECD may be used for instance in automobile registration or electronic tolling stickers to indicate current status or expiration. In a cold supply chain an electrochromic indicator may provide visual indication as to the condition of refrigerated shipped products that may have exceeded their safe temperatures.

In one example, a wireless RFID chip such as EM Microelectronics' EM4325 is used as an identification and control element for an electrochromic indicator. The RFID chip may be integrated into a tag or card format that includes a suitably tuned antenna and battery. Flexible formats may utilize a thin film battery, for example from Blue Spark Technologies (Westlake, Ohio). Card formats may use thin film batteries or coin cells. An electrochromic indicator integrated into an RFID tag or card for instance may be switched upon a command from an RFID reader. Alternatively the electrochromic indicator may be switched autonomously and automatically by the chip based upon conditions such as elapsed time, exceeding temperature limits, or based on other sensed conditions when combined with appropriate sensors. Using a commercially available RFID chip such as the EM4325 constrains the operation of the electrochromic indicator to the capabilities of the chip. For instance the control of the signals, i.e. the applied voltage, to the electrochromic indicator requires that the RFID reader send separately transmitted commands to the RFID chip to sequentially turn the applied voltage ON and OFF. Thus the time required for an optimum activation cycle demands that the reader remain in constant communication for the entire time duration. Certain of these limitations may be overcome by prescribing an activation sequence in which a brief initial phase places the chip and electrochromic indicator into a specific state that can persist indefinitely without the need for ongoing communication with the reader. One such sequence would comprise first establishing a communication with the chip, followed by a short first activation, i.e. less than one second, and then followed by a second command to reverse the voltage polarity, and then leaving the chip in this state indefinitely without further interaction with the reader.

The electrical parameters for switching the electrochromic device may further be altered depending on conditions such as ambient temperature or pressure to compensate for changes in the reaction times of the device under these varying conditions. For instance a control chip comprising temperature or pressure sensing capability can alter the activation times and voltages to optimize the switching characteristics even though the ambient conditions may change. In one example the RFID chip provides the ability to pre-establish (i.e. pre-program) one or more activation sequences. In this case the reader and chip need only remain in communication for a very brief time to trigger the desired activation process, whereby the chip has the ability to perform the entirety of the process without further interaction with the reader.

Enabled Applications

Figure 6:
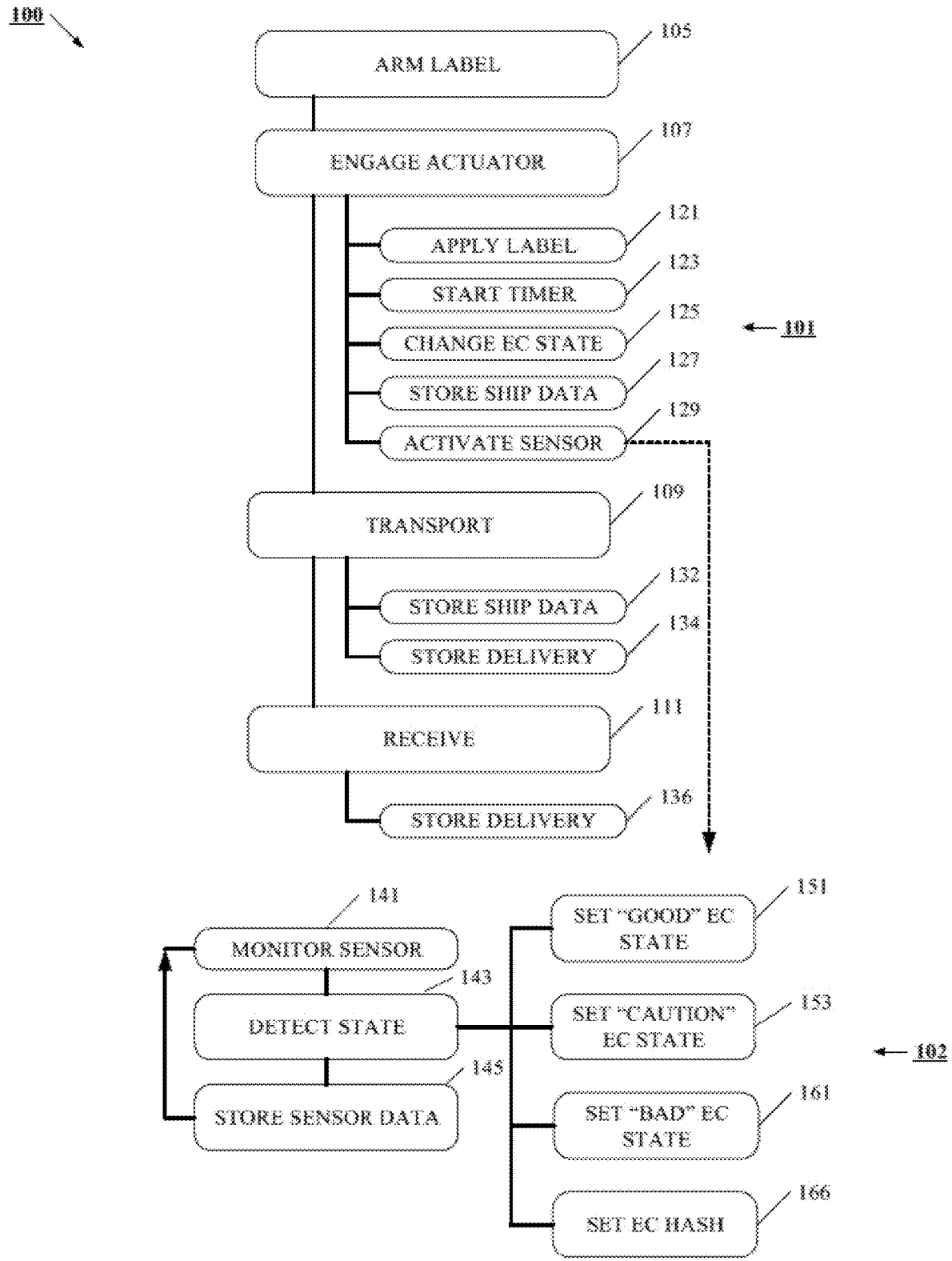
FIG. 6 is a process for using an intelligent label made in accordance with the present invention.

Referring now to FIG. 6, a method 100 for using an intelligent label is shown. Method 100 uses an intelligent label, such as intelligent label 75 described with reference to FIG. 4. As illustrated in block 105, the label is first armed during the manufacturing process for the label, or may be armed just prior to use by activating its power source. As such, the label operates in an extreme low-power mode, and in some cases may be constructed so as not to consume any power whatsoever until time for activation. When it is time to apply the label to a good or package for shipping, the label is actuated such that the label becomes electronically active as shown in block 107. The act of preparing and applying the label 121 electrically activates the processor and may be useful for starting a timer 123. In this way, the intelligent label is able to capture a time, that may include the current date and time, that the label has been attached to the good.

Concurrently with starting the timer, the state of the electrochromic indicator is changed 125 so that those applying the label can see that the label has been properly activated. Shipping data 127 may then be stored for the package, which includes information regarding the item, the date and time the label was applied, ship-to data, and other data that may be useful for shipping of the item. In some cases, the intelligent label will have a sensor that can also be activated 129. As part of the activation process, specific rules as to allowable environmental conditions may be set, as well as rules regarding time for shipment. It will be understood that many different rules may be set for the intelligent label. Most typically, the communication with the intelligent label will be done through a wireless radio frequency communication, such as RFID, Bluetooth, or 802.11

If a sensor is active on the intelligent label, then sensor monitoring process 102 is engaged. During process 102, the computer processor monitors the sensor 141 and detects the current condition of the sensor as shown in block 143. The sensor data may then be stored and compared to rules as shown in block 145. The processor and monitor continue to monitor the proscribed environment conditions throughout the transport process 109. During the transport process, the intelligent label will show that the product is in the good state as shown in block 151. Provided the sensor detects some abnormality in the environment condition, or a required time is running close, then the product may be set to a caution state is shown in block 153. Finally, if the sensor has detected catastrophic environmental conditions, or time has run out on the shipping rules, then the product may have its electrochromic indicator set to indicate a bad state as shown in block 161. In each case 151, 153, 161 the processor would send the appropriate electrical signals to the electrochromic indicator next to a human readable indicator for the state of the good. In another example as shown in block 166, further information may be derived from sensor and timer data and used to modify an electrochromic material to set a more data-rich display code. Depending upon the complexity of the code, significant information may be visually communicated to someone without the ability to wirelessly interrogate intelligently, and do so simply by reading a hash code.

As the product moves through the supply chain 109 at each point in the transaction the intelligent label is able to store shipping data 132 and final delivery data 134. Typically, this information is stored and modified in the intelligent label using a wireless RF communication. Also, at each point in the shipping transaction the shipping information will often be collected and communicated to a central database by the shipper, so that both the original shipper and the ultimate consumer may track the product through the shipping process. Finally, the end-user consumer receives the product 111. In some cases, the final delivery point may be able to store delivery information in the intelligent label as shown in block 136. At each point in the transportation process 109 and at the time of receiving the good 111, the intelligent label advantageously shows a visual indication of whether or not the product is good or not good. In this way, the receiver of the good is able to make an informed choice whether or not it is receiving a good in working condition or that is appropriately fresh. The temporal and optionally any other electronic information on the activation of visual indicators may also be communicated from the label and stored in this database.

Figure 7:
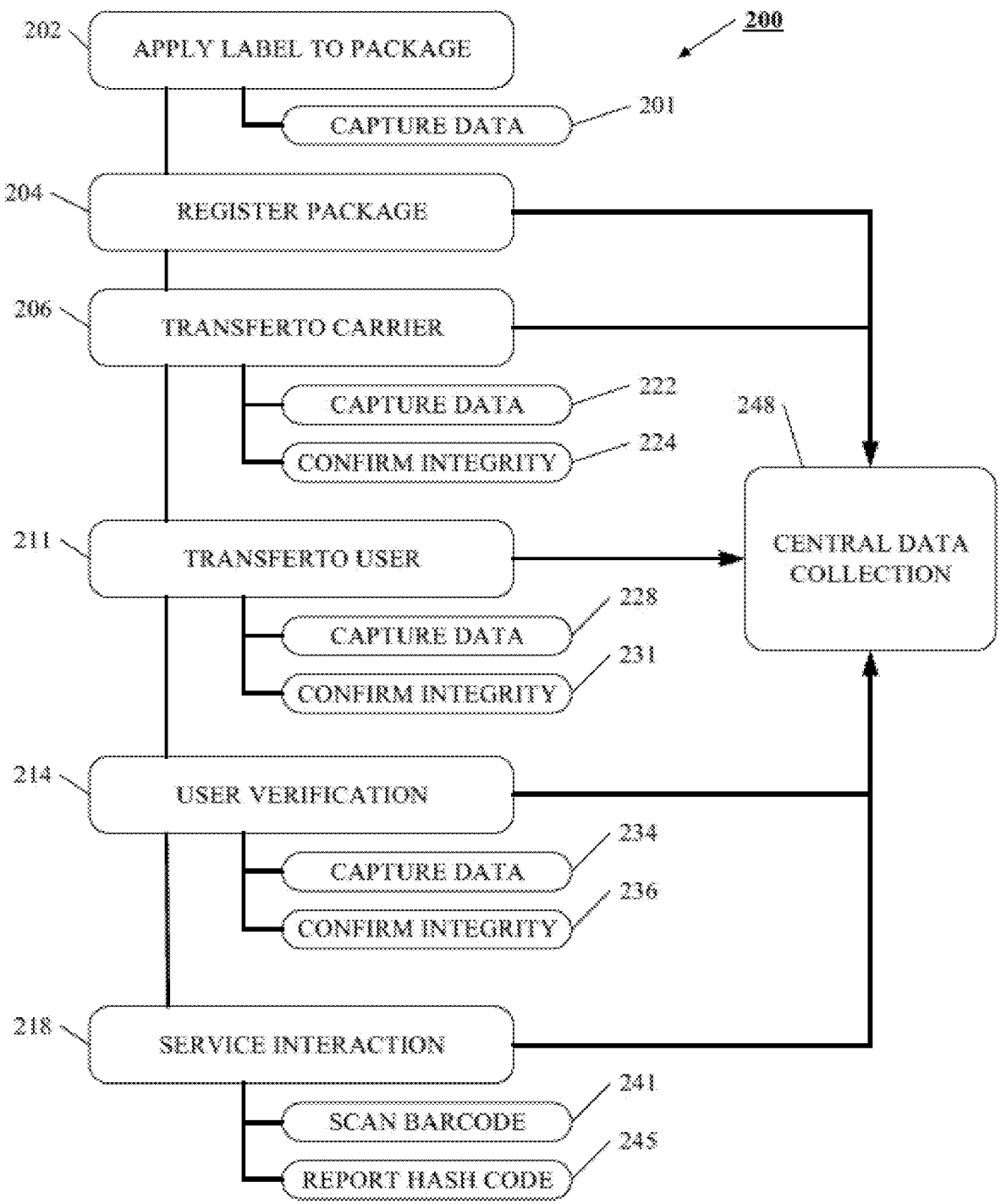
FIG. 7 is a process for using an intelligent label made in accordance with the present invention.

Referring now to FIG. 7, a process 200 using an intelligent label is illustrated. In one example, process 200 uses an intelligent label such as the intelligent label 75 illustrated with reference to FIG. 4. In block 202 the label is applied to a package, and in the process of applying the label, the label is activated as shown in block 201. In this way, the label is able to robustly and accurately collect the time and day that the label is applied to the package, which begins the shipping process. In block 204, a wireless communication may be used by the shipper to register the package information captured at time of shipping, which then may be collected at the central data collection 248. The shipping product may then be transferred to one or more carriers for delivery as shown in block 206. Each time the good transfers carrier, were transfers to a new route of a single carrier, the carrier or carriers will capture data 222 and confirm the integrity 224 of the good. Again, as these carriers tend to be professional carriers, it is likely they will have the motivation to invest in significant wireless indication devices for communicating directly with the intelligent label using RFID, and for storing additional information in the intelligent label. In some cases, however, the presence of the electrochromic indicator is still useful for confirming integrity 224. For example, a fork lift driver may see that the electrochromic materials for a particular palette of goods is indicating the goods are no longer fresh. This would place the forklift driver on notice that the goods should not be accepted and transferred into the next carrier or the next leg of the route. Again, information wirelessly collected by each of the carriers is likely transmitted to a central data location.

The good eventually is transferred to a user, for example, by delivering the good into a mailbox for the user as shown in block 211. The carrier may be able to capture some date at 228 and confirm integrity 231 electronically at the time of delivery if the delivery vehicles are equipped with portable RFID readers. In other cases, the carrier would be able to visually look at the package and assure it was of good quality before placing in the mailbox. To the extent data was collected electronically, the information again would be transferred to a central data location 248. At some point, the consumer will receive the product as shown in block 214. In most cases, the end user will not have the ability to interrogate the intelligent label using a wireless RFID reader. Instead, the user will verify whether or not the product is good 236 by looking at the state of the electrochromic indicator. If further information is needed regarding the product, the user may be able to take a picture of the label, including any barcode or graphical information, and captured data as shown at block 234. In this way, if the end consumer needs to interact with the service department of the company providing the good showed a block 218, the user will be able to use scanned barcode information 241 to send to the service rep to quickly and accurately identify the good that was shipped. In one example, if the electrochromic material shows that the product is not good, it would not be possible without wirelessly interrogating the intelligent label to know when the product went bad. For example, the final shipper may have placed it in the mailbox when it was a good state, but the user may have waited several days to collect the good from the mailbox. When the end consumer calls the service department all they would be able to communicate is that the product is bad. Accordingly, in some cases the smart label may be able to report a hash code to 45. This hash code may be derived from significant information regarding the handling or conditions for the good. For example, the hash code could be set to a particular code if the product was dropped into the mailbox in a good condition, and with more than minimum amount of time remaining in its freshness life. Thus, by knowing the code, the service department would be able to accurately determine if the time delay was from the carrier or from the consumer being lax in retrieving the good from the mailbox. In this way, the company's service organization would be able to retrieve significant information regarding the shipping process and environmental conditions for the good without the need for returning the label to the company, or having the end-user take the good someplace for wireless interrogation. Further, the information can be used to provide feedback and improvement to the overall shipping process.

It is increasingly desirable and feasible to add ultra-low power electrical functions such as RF communications, sensors, displays and electrical state indicators, memory, conditional rules/logic, clocks/timers etc. ("Electrical Functions") to a wide range of items including tags, labels, documents, forms, envelopes, boxes and other types of packaging, payment/pre-paid cards ("Items").

Adoption however continues to be slow because the benefits implicitly depend on remote/external systems (e.g. RFID). Systems and methods that depend on remote/eternal systems are inherently costly and they depend on a level of compliance among the participants that seriously diminishes their effectiveness and critically, their conformance to existing business practices. Due to the current state of the art, the alternative is standalone devices, typically utilizing discrete components that are too costly and cumbersome for wide scale adoption (at the pallet, much less item level).

It is important to note that the ultimate goal of many applications in this area (and the key to adoption) is simply to enable intelligent actions on the part of persons in proximity to the Item: e.g. the loading dock employee in charge of receiving (or rejecting) deliveries, the doctor deciding whether (or not) to dispense a drug of unknown pedigree or provenance, or the consumer deciding whether (or not) to consume (and pay for) products delivered directly to their homes.

Figure 11:
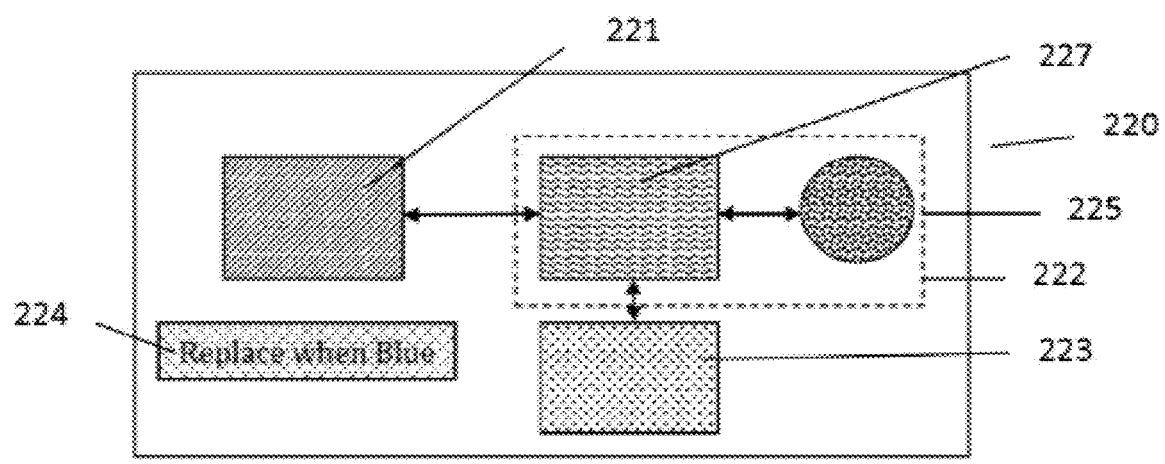
FIG. 11 is a block diagram of an intelligent label made in accordance with the present invention.

FIG. 11 shows an example of a label 210 made according to the teachings of this invention. Label shows electrochromic indicator 211 in communication with "Electrical functions" 217 comprising a microprocessor 212 and an optional sensor 216. The microprocessor is in communication with an energy source 213. A human readable indicia is shown as 214. Human readable indicia provides instructions on the action to be taken when the electrochromic indicator 211 has changed to a certain state, and in this case to a blue color. In a label only electrochromic indicator 211 and the human readable indicia 214 may be visible, and the other components may be hidden by placing a cover on the other components. This cover may have other printed details regarding the item or good. If the energy source is a solar cell, then it is exposed to interact with the ambient lighting.

FIG. 12 shows an example of another label 220 made according to the teachings of this invention. Label shows electrochromic indicator 221 in communication with "Electrical functions" 227 comprising a microprocessor 222 and an optional antenna 225. The Electrical Functions is in communication with an energy source 223. Human readable indicia is shown as 224. The antenna communicates with external sources to transmit the state of the label or for example receive information (inputs and/or condition variables) from outside to activate the electrochromic indicator. Actuator is not shown in these figures, and one may create several permutations and combinations of features on these labels.

Conditional Rules may be used by a processor on the label, and are typically expressed as mathematical algorithms that effect an action once specific conditions are met (e.g. activate an electrochromic indicator). The conditions are often expressed as variables ("Conditional Variables"). The Conditional Rules in conjunction with Conditional Variables and inputs ("Inputs") received from sensors, clock/timers, subroutines etc. determine whether the conditions have been met. If they are, then a new 'state' has occurred and one or more outcomes are affected e.g. an electrochromic indicator is activated visually indicating the occurrence of the new state. The meaning of the new state would typically be communicated by human readable indicia proximate the electrochromic indicator (and corresponding to the Conditional Rule). Some of the condition rules may be stored on the label as tables and/or algorithms in the module providing Electrical Function or may be accessed by the Electrical Function by communicating with an external source through an antenna and/or through the sensors.

Conditional Rules may have certain rules which may be integrative, e.g., time-temperature integration leading to a condition, vs. strictly algebraic where if certain parameters exceed a limit, for example exceeding a prescribed time or temperature will result in an action triggering a change in the label. One may also combine these types of factors. Electronic state indicators are constructed as electrochromic indicators, and are devices that visually indicate 'states'. Preferably an electrochromic indicator is activated by ultra-low power, bi-stable pre and post activation, or is irreversible. And further, preferably can be integrated into a label with an appropriate physical form factor. An example of a desirable ESI is an electrochromic display of the kind described in published US patent application Flexible and Printable Electrooptic Devices (2011/0096388), the disclosure of this application is incorporated herein by reference as if set forth in its entirety. In some applications it is desirable that the visual state of the electrochromic indicator can be confirmed electronically, e.g., the visual change is accompanied by a change in impedance or voltage, e.g., "State Detection".

The human readable indicia visually communicate the 'meaning' of corresponding electrochromic indicator and their state. The human readable indicia are typically printed and preferably located proximate their corresponding electrochromic indicator. However, in the case of an electrochromic indicator in which one state is substantially transparent, the human readable indicator can be printed beneath the electrochromic material. In this way, the ability for the human to read the human readable indicator would be determined are the transparency or opaqueness of the electrochromic material. The human readable indicia can be added to a Label at any time it is advantageous to do so, e.g. anywhere from the point the Label is manufactured to the point it is applied to an Item.

The electrical functions on the intelligent label may include logic and memory, power management functions, one or more sensors, radiofrequency or other communication interfaces, or state indicators for determining the state of the electric chromatic material. It will appreciate that other electronic functions may be added according to application specific needs for particular shipping or item requirements.

In some cases, the intelligent label may include electronic circuitry for performing state detection of the electrochromic indicator. More particularly, the date detection circuitry may at a particular time determine the state of the electrochromic indicator, or it may be able to detect a change in the state of the electochromatic material. In some cases this may be done by a direct electrical interrogation of the characteristics of the electrochromic indicator, and in other cases may be done by sensing the changes in the circuit used to activate the electrochromic indicator. Changes in the activating signal corresponding to a change in the state of the electrochromic indicator, corresponding to the outcome of a Conditional Rule. The detected state, typically being stored in memory and along with associative information related to the corresponding Conditional Rule (e.g. the relative or absolute time the Conditional Rule was met, the Inputs were received that triggered the Conditional Rule and the outcome(s) affected (e.g. a signal was transmitted to the ESI). And depending on the ESI, the length of time it was visually communicating the changed state (e.g. how long the ESI remained in the changed state). A State Detection function serves to confirm that an ESI did in fact change, thus visually communicating a state change in accordance to a corresponding Conditional Rule. In practice, the State Detection function and associatively stored data, provides means to authenticate the visual display of the state change and audit actions, or lack thereof, taken on the part of anyone claiming to have seen the label.

An energy source that powers the electrical functions on the intelligent label may include sources such as a battery, charged capacitor, solar cell, or antenna/receptor that receives energy from an external/proximate source, or a combination of sources. Labels may include one or more actuators ("Actuators") that activate the Label (e.g. that initiate Conditional Rules, clock/timers, sensors, data logging, ESI etc. upon activation). Multiple actuators may be used to activate different Electrical Functions at different times e.g. when an Item is shipped (a package is sealed) and when the Item is received (the package is opened). Exemplary Actuators include such as those described in US provisional patent applications Physical Actuator for Labels (U.S. provisional application 61/955,237), Separator Actuators for Labels (U.S. provisional application 61/955,236), and Seal Actuator (U.S. provisional application 61/955,236), each of which is incorporated herein as if set forth in their entirety. Actuators may also be RF signals if the Label is equipped with an RF interface, electrical signals if the Label is equipped with an electrical interface, a mechanical force if the Label is equipped with an electro-mechanical interface, an optical signal if the Label is configured with an optical interface etc.

It is desirable for the Conditional Rules and Conditional Variables to be relevant to the Item to which the Label is actually applied. Different goods will have different sensitivity to environmental conditions, age, allowable time of transmit, approved distributors and retailers and shippers, and particular requirements for customer delivery. Since the particular Item is often unknown until the Label is about to be applied to it, it is desirable to have simple systems and methods to dynamically program the appropriate Conditional Rules and Conditional Variables into Labels and to print the corresponding human readable indicia onto the Label.

In this regard, the Conditional Rules and corresponding Conditional Variables and human readable indicia may be grouped to form a profile ("Profile"). The components of a Profile can be selected from appropriate databases or customized. Individual Items are typically grouped into one or more categories or classes each with a corresponding identifier ("Class ID"), e.g. an SKU. The Class ID can be associated with a Profile so that when an Item is identified, its Class ID can be used to identify the appropriate Profile and corresponding Conditional Rules and Conditional Variables can then be written to memory in the Label and concurrently the human readable indicia printed on the Label. The same process can be used to select Conditional Rules and Conditional Variables pre written (already in the Label's memory—e.g. default values). Profile values can be dynamically completed or updated. A single Label may support multiple Items of different classes (e.g. a single box with multiple Items belonging to multiple Classes) thus more than one Profile may be used with a single Label. A single Conditional Rule can activate more than one electrochromic indicator.

It is also desirable to have simple, easy to understand systems and methods for automatically and robustly activating Electrical Functions on the intelligent label that gets associated with a particular item. It is particularly desirable that this activation be an automatic byproduct of existing and required shipping processes: e.g. sealing an envelope, bag, box or other packaging, a document or label, and be done at a known point in a process: e.g. when an Item is sealed prior to being mailed or shipped, stored, or unsealed prior to being opened. In one example, the activation is accomplished using an existing function associated with sealing a package or applying a label to the package. A Seal Actuator is one or more articles comprising in part two surfaces ("Surfaces") configured so that when the Surfaces are adhered or otherwise physically coupled to each other ("Sealed") they complete a circuit ("Circuit"). The Surfaces may be on the same article (such as an envelope configured so that when folded two surfaces meet/seal) or separate articles (such as sealing tape and a box). The Circuit comprises in part, a gap ("Gap") that when conductively bridged, completes the Circuit activating one or more Electrical Functions. A conductive element ("Bridge") is located on the Surface opposing the one with the Gap, and configured so that when the Surfaces are sealed, the Bridge conductively bridges the Gap and completes the Circuit. The Bridge may be any conductive material or combination of materials and means, that separately or in combination conductively bridge the Gap when the Surfaces are sealed. The Electrical Functions and an Energy Source are disposed on, or proximate the Surfaces. Preferably the Electrical Functions include an electrochromic indicator that visually communicates that the Item (Electrical Functions) has been activated (sealed). In some applications it may be advantageous to include a power management function so that the Bridge needs only to enable a detectable, hence ultra-low power signal for Electronic Functions to be activated.

Exemplary seal actuators. In the various examples illustrated below, only the gap and bridge need to be on opposing Surfaces. The Electrical Functions and the Energy Source can be located on either Surface. A seal actuator is provided such that a circuit is in an open condition when the package is not sealed, and upon sealing the package, the circuit is completed, thereby enabling a signal to be sent to the electronics of the intelligent label, including the processor. In particular, one side of the sealing structure contains an electric circuit with a gap in a conductor, and the other sealing surface contains a bridge, that when the seal is engaged, bridges the gap.

A Seal Actuator that is used in conjunction with a power management functions and Electronic Functions to activate and enable the Electronic Functions, which may be further indicated with an electrochromic indicator. Conductive inks and adhesives are available for Bridge elements, or connecting label components. EMC (www.conductives.com) and 3M (www.3m.com) offer ranges of suitable conductive adhesive products, including silver thermoset ink, carbon ink, z-axis and isotropic conductive film adhesives. Such products may be used directly as a Bridge element, or as an adhesive for connecting a discrete bridge, e.g. a metal foil element or wire micro-filament.

A typical power management function implementation of involves voltage sensing on a specified input(s) causing the circuit to leave the sleep state and become active. Typically a change in the voltage on the sensing input, i.e. an "edge", triggers a wake-up event. The sensed voltage may be the same source of voltage as that which fully powers the Circuit when awakened. This can be achieved by connecting a power source to the sensing input via a conducting path, e.g. a bridge. The sensing input may be a FET or other input that inherently draws negligible current in itself. When a bridge is removed or added, e.g. when the Circuit is made or broken, the voltage changes, the edge is detected by the wake-up block and further activates a power management portion of the circuit, and subsequently activating the Electrical Functions.

Figure 12A:
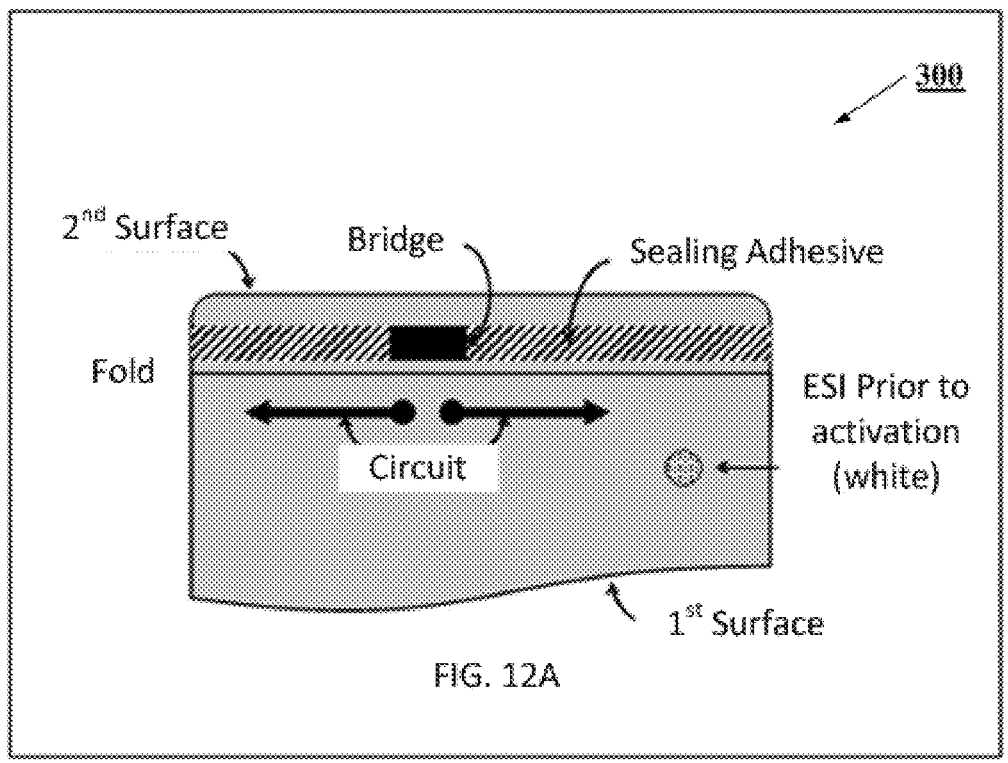
FIGS. 12a-d illustrate an actuator for an envelope using an intelligent label in accordance with the present invention

FIG. 12a shows one example of a seal actuator 300. Seal actuator 300 has a lower seal portion that has two circuit conductors that extend to the electronic circuitry of the intelligent label. However, as shown, the circuit has a gap such that the circuit remains in an open condition as long as the upper flap (second surface) remains in its unsealed position. The second surface, which is above the envelope fold, has a sealing adhesive. A conductive bridge sets in the sealing adhesive, and is positioned so that when the envelope is closed, the bridge will electrically close the gap. In the unactivated state, the electrochromic indicator remains white, so that it is visually obvious to shipping personnel that this envelope is available for use and has not yet been activated.

Figure 12B:
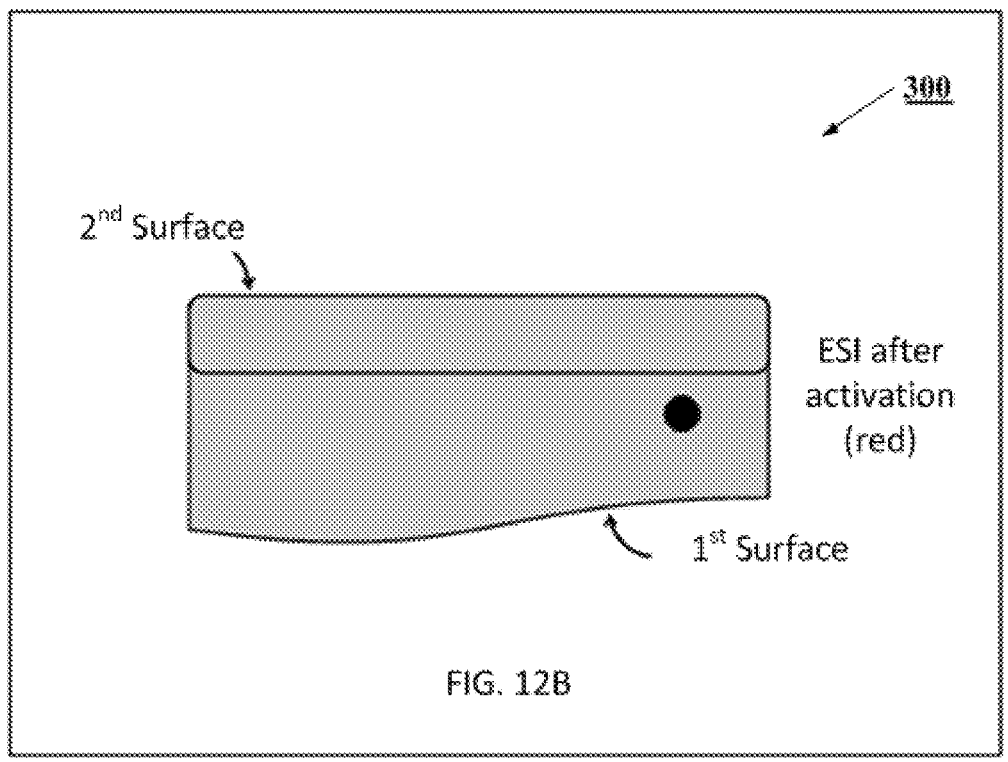

When an item has been inserted into the envelope, and the shipping personnel are ready to send the package, the shipping personnel fold the second surface such that it contacts and seals against the first surface. In doing so, the envelope is sealed by the sealing adhesive, and the bridge is enabled to electrically connect across the circuit gap. In this way, the processor is notified that the envelope is now sealed, and the processor can proceed to capture the exact time and date of sealing, and send the appropriate electrical signal to the electrochromic indicator to change its state. FIG. 12b shows the envelope after sealing. The second surface has been adhered to the first surface, and the processor has activated the electrochromic material such that electric chromatic material is now black. In this way, shipping personnel are automatically notified that a proper seal and timestamp have been obtained.

Figure 12C:
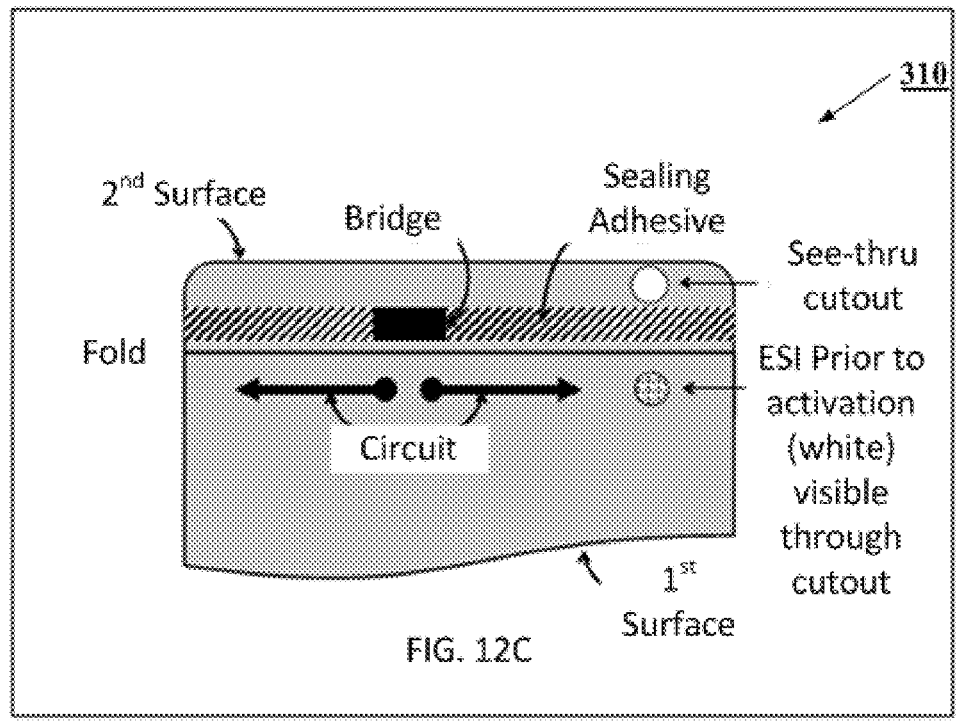
Figure 12D:
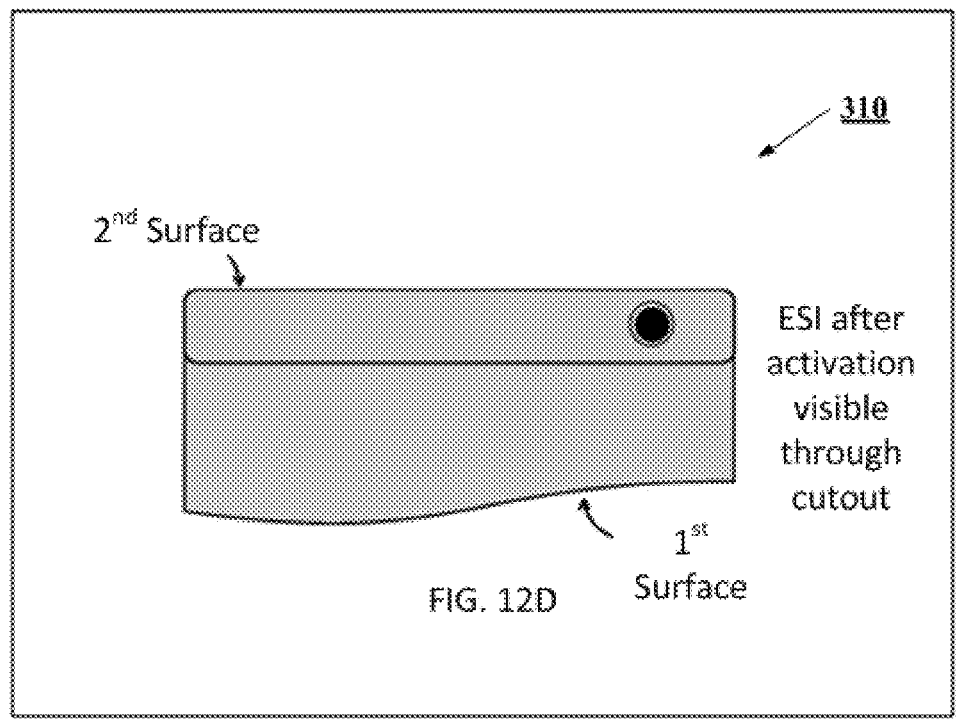

FIG. 12c shows a slight modification 310 from the sealing actuator described with reference to FIGS. 12a and 12b. In FIG. 12c, the same electrical bridge and gap construction is used, however the electric electrochromatic material is positioned such that it will be located in the flap, rather than further down on the first surface. To facilitate viewing the electric electrochromatic indicator after activation, a hole is placed in the second surface flat. In this way, as shown in FIG. 12d, a user is still able to clearly see the state of the electroic chromatic material.

Figure 13A:
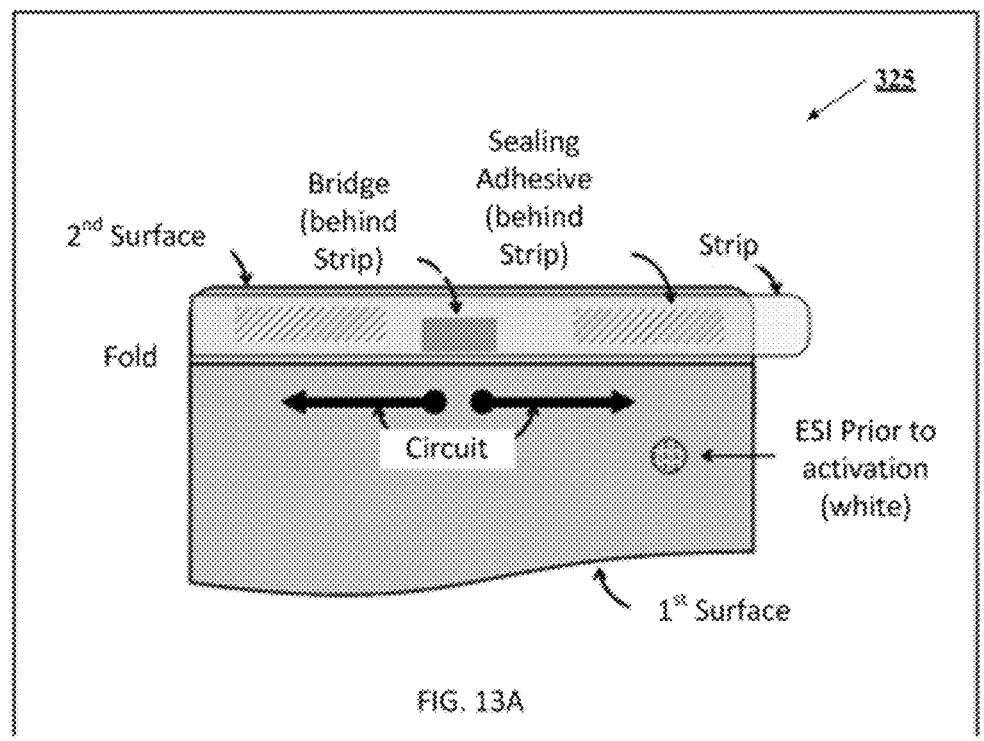
FIGS. 13a-c illustrate an actuator for an envelope using an intelligent label in accordance with the present invention

FIG. 13a shows another example of a seal actuator 325. Seal actuator 325 has a lower seal portion that has two circuit conductors that extend to the electronic circuitry of the intelligent label. However, as shown, the circuit has a gap such that the circuit remains in an open condition as long as the upper flap, second surface, remains in its on sealed position. The second surface, which is above the envelope fold, has a sealing adhesive typically covered by a removable paper. A conductive bridge sets below the removable paper, such that if the second surface is accidentally pressed against the lower portion, the circuit will not engage. In the unactivated state, the electrochromic indicator remains white, so that it is visually obvious to shipping personnel that this envelope is available for use.

Figure 13B:
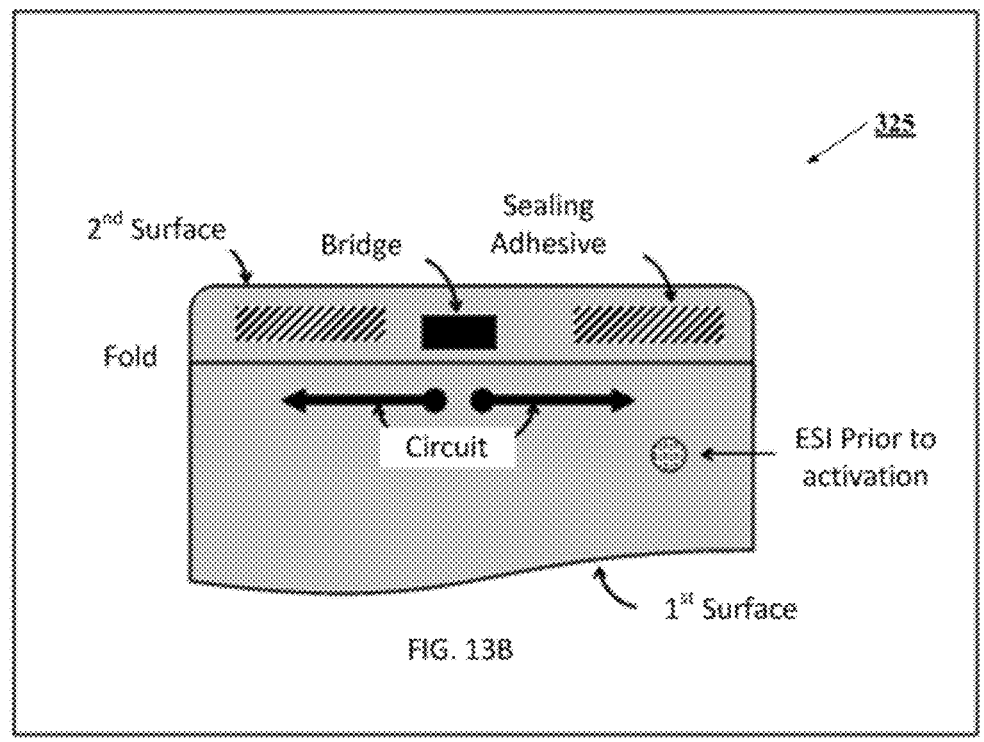
Figure 13C:
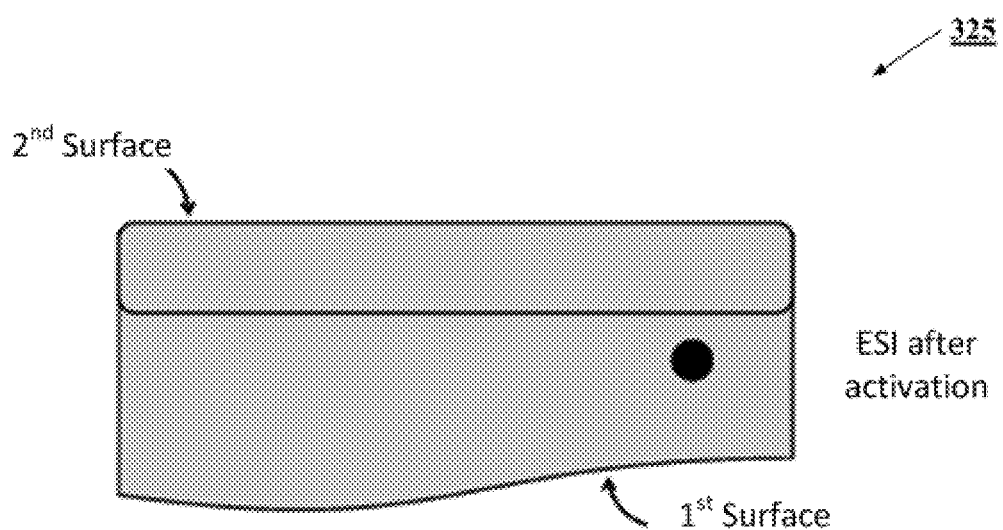

When an item has been inserted into the envelope, and the shipping personnel are ready to send the package, the removable paper is removed from the sealing adhesive as shown in FIG. 13b, exposing both the adhesive and the conductive bridge. Shipping personnel fold the second surface such that it contacts and sealed against the first surface. In doing so, the envelope is sealed by the sealing adhesive, and the bridge is enabled to electrically connect across the circuit gap. In this way, the processor is notified that the envelope is now sealed, and the processor can proceed to capture the exact time and date of sealing, and send the appropriate electrical signal to the electrochromic indicator to change its state. FIG. 13c shows the envelope after sealing. The second surface has been adhered to the first surface, and the processor has activated the electrochromic material such that electrochromic material is now black. In this way, shipping personnel are automatically notified that a proper seal and timestamp have been obtained.

Electro-Optic Indicator

The electrochromic indicator used on the intelligent label has been particularly formulated, constructed, and activated for enablement of an economically feasible intelligent label. Such indicators, their construction and materials used have been fully set out in published US patent application number 20110096388, which is incorporated herein as if set forth in its entirety.

The electorchromic (EC) display devices may comprise of several layers, sometimes the EC material (a preferred category of an electrooptic material) is located on an electrode as a separate layer from the electrolyte, and sometimes EC material may be both in the electrolyte and in additional layers, and yet in other cases it may solely reside in the electrolyte. Since one of the primary objective of the invention is low cost products, it is preferred to reduce the number of layers in an EC device, thus those EC devices where the EC material is resident only in electrolytes and additional electrochemically active layers are not used and are most preferred device constructions. Redox materials/species are those that undergo electrochemical oxidation and reduction upon device activation, and these may be reversible or irreversible. During use, the device is activated by applying a potential across the opposing electrodes, i.e., the negative polarity electrode is cathode and the positive polarity electrode is an anode. Cathodic redox undergo reduction at the cathode and the anodic redox undergo oxidation at the anode. In addition, it is preferred that all of the layers are printed sequentially until the device is complete.

The electrolytes that are deposited by printing should become solid after deposition. This may be due to the removal of a solvent, cooling or by further reaction (e.g. polymerization and/or crosslinking). The electrolytes may be hydrophilic or hydrophobic (latter are preferred). For hydrophilic electrolytes those systems are preferred where the device performance is not dependent too much on water content, otherwise the performance of this device will change when subjected to different environmental conditions.

There may be several methods to create such devices. One method to create the EC indicators is described in US patent applications 2008/0204850 and 2007/0139756. These devices use predominantly use a vapor deposited metal layer as a color changing material that is oxidized upon device activation causing a permanent image change. However, these devices use at least two additional layers in addition to a conductive layer (which may be also a transparent conductor). A more preferred method is the one taught in published US patent application number 20110096388 where redox agents (e.g., monomers) are present in the electrolyte that become colored upon polymerization which is initiated by applying the activation voltage to the device, and that this polymerization cannot be reversed. Typically the polymerized material deposits on one of the electrodes. These are particularly suitable for those applications where only a single activation or a permanent change is required. Many polymers are conjugated and hence deeply colored, whereas their monomers are not. The literature is replete with examples where such polymer coatings are formed on conductive electrodes by electrochemical or chemical methods. These substrates where such coatings are deposited are then used to fabricate EC devices. In the completed EC devices, these coatings are electrochemically reduced and oxidized reversibly to change their color. However, those EC devices have not been taught before where the complete device itself contains a monomer, and the mechanism of coloration of the device upon electrical activation is by polymerizing this monomer such that a colored polymer is formed. Formation of this polymer also leads to a irreversible change in the device from a first to a second optical state. In one embodiment, the device is assembled with monomer in the electrolyte (i.e., the monomer is present in the electrolyte of the completed device), and the electrochromic activity in the completed device is derived by a polymerization process caused by electrically activating the device during its use. Further, the monomer polymerizes (electro-polymerization) at one of the electrodes resulting in a colored species. If this coating has a reasonably good adhesion to the electrode, the image does not smudge with time as the polymer or the colored species does not migrate. Depending on the composition of the electrolyte, the above device may change from the second to a third optical state upon reversing polarity, and further in some cases the change between the second and the third optical state may be reversible or bistable. These bistable changes can be caused by a reversible change in the redox state of the polymer (i.e., polymerized monomer) which was formed in the first activation step.

There are several known EC devices which make use of monomers to deposit electrochromic EC layers as described earlier. Also there are EC devices where EC devices are fabricated with monomers in the electrolytic formulations, but these monomers are polymerized thermally or by radiation to solidify the electrolyte but not to cause a color change by activation of the device. However, the use of monomers in the electrolyte of finished devices, where the monomers polymerize to a colored state upon polymerization is novel. A few examples of these will be discussed to clearly bring out distinctions between the past devices and the present invention and teachings. PCT application WO 2006/008776 describes addition of oligomers (all polymerizable materials are considered as monomers in this patent application) to the electrolyte, where such monomers are polymerized to change the liquid electrolyte to a solid electrolyte for forming mechanically self-supporting solid electrolyte layers. This polymerization does not lead to an electrochromic effect and do not contemplate a presence of a monomer in a finished device where the electrochromic change is caused by polymerization activity of this monomer. In other words, a finished device constructed according to the teachings of WO 2006/008776 has no monomers present which are polymerized to cause an electrochromic change while such devices are in placed in service. In the present invention, one may use a first polymerizable monomer in the electrolyte along with a second monomer which will lead to the electrochromic effect. The first monomer is polymerized during device processing so that a liquid electrolytic formulation is printed, and the first monomer is polymerized (by heat or UV, etc.) to convert this liquid into a solid layer. The second monomer is still present in the solid layer (as redox or electrochromic material) and continues to be present in the finished device. When the device is activated during use, the second monomer is polymerized at one of the electrodes and results in a change of color (electrochromic). As another prior art example which is different from the teachings of the present invention is in U.S. Pat. No. 5,253,100. In this patent an electrochromic monomer aniline is polymerized to yield an electrochromic electrode by dipping a conductive electrode in a monomer solution. The polymerized monomer (or the electrochromic polyaniline electrode) has a different color. This electrode with the polymerized layer is removed from this solution, and is then used further to fabricate a device by combining this with an electrolyte and an opposing electrode. In the finished device the reversible electrochromic properties are derived by repeatedly oxidizing and reducing the polymeric (polyaniline) layer by extracting or inserting ions from the electrolyte, there is no monomer (or aniline) present in the finished device which will result in the desired electrochromic properties upon activation. However, in the present invention, electrochromic monomer is present in the electrolyte of the finished device and the device is in its first optical state, and when the device is activated during use, the monomer from the electrolyte deposits on one of the electrodes and simultaneously polymerizes. This polymer is of a different color and causes an irreversible change which results in the device going to a second optical state. This is an irreversible change as the device cannot go from the second to the first optical state by simply reversing the potential where the polymer depolymerizes into the initial monomer. Depending on the composition of the electrolyte, it is certainly possible to reversibly change the second optical state of the deposited polymer into a third optical state by further reducing or oxidizing this polymer layer, and it may even be possible that the optical states between the second and the third state are reversible by applying appropriate voltage to the device. However, an optical change from the first optical state to the second optical state is permanent.

There are many materials that can be electro-polymerized from colorless or faintly colored monomers to deeply colored polymers that absorb all or part of the visible radiation. Those materials are preferred which upon polymerization form conductive polymers. Some of these electrochemically active polymers useful in the instant invention include (which can be polymerized from their monomers present in the electrolyte), without limitation, polyphenylene vinylenes, polythienylene vinylenes, polyalkoxythienylene vinylenes, polyfurylene vinylenes, polythiophenes, polyisothianaphthenes, polyanilines, polyarylamines, polyindoles, polypyrroles, polyalkoxyphenylenes, polyphenylenes, polyperinaphthalenes, polynaphthylamines, polyvinylmetalocenes, polymers of heteroaryls linked to metals (e.g. see US patent application 2007/0191576), carbon cluster (fullerenes) and carbon cluster containing polymers, polyimides, polyviologens. Other electrochemically active polymeric materials which may be employed in the present invention include, without limitation, derivatives of the aforementioned polymers, such as those prepared by sulfonation or substitution, copolymers (from a mixture of monomers), blends and composites, where the matrix may be organic or inorganic but at least one of the components is from the polymers or their derivatives described above. Further, depending on the specific monomer one can obtain different colors. Thus multicolored images and displays may be formed.

FIGS. 14a and 14b show an EC device 500 using two active layers which is formed using the teaching of this invention. The device 501 in FIG. 14a a is not in activated state, and the device 502 in FIG. 14b has been activated during use causing a non-reversible electrochromic change. In both of these devices only one set of pixel is shown for clarity. In both of these figures a substrate is shown which is used to form this device. This substrate may be transparent and may be part of the substrate which is used to form the smart label. The two conductive electrodes CE-1 and CE-2) are formed on the substrate. These may be transparent (e.g., ITO) or non-transparent such as metallic. Typically these may be formed by first deposition of a uniform conductive electrode and then selectively etching them to form the two opposite electrodes, or these may be printed in the desired pattern so that no etching is required. For indicators, it is preferred that when the two electrodes are on the same substrate, that interdigitated pattern be used so that there is a long path length along which the deposition takes place making the indicator appear dense with high contrast. Printable inks which comprise of conductive particles (transparent, or metallic, micro or nanosized particles) can be used and then cured (or solidified) after printing by either removal of solvent, polymerization of a binder material or sintering of the conductive particles, or by several of these mechanisms working simultaneously. Once this is done an electrolyte is deposited which comprises an irreversible redox material, such as a monomer. The electrolyte may be deposited by printing and this layer and is solidified (or cured) either by removing a solvent or by polymerization of another monomer in the electrolyte by radiation (such as UV) or heat. This layer is then protected by a cover (e.g., a pressure sensitive tape, an adhesive layer, or a film/sheet which is sealed at the perimeter, etc.). The finished device on the label is connected by connecting the two opposing electrodes to the powering electronics.

When a voltage or power is applied across these conductive electrodes, the electrochromic change from optical state 1 to the optical state 2 occurs by polymerization of the monomer from the electrolyte which deposits on one of the conductive electrodes as shown in FIG. 14b. This change is permanent, i.e., optical state 1 cannot be attained by depolymerizing of the deposited coating. If the substrate and the conductive electrodes are transparent, the electrolyte may be opaque and the optical change or the color change is observed when viewed through the substrate. When the substrate or the conductive electrodes are not transparent then a transparent electrolyte and cover is used so that the optical change can be observed from the top (through the cover).

An advantage of these devices is their durability or permanence, i.e., being able to visually differentiate the activated and the non-activated state even after the labels have been subject to harsh environmental conditions or stored for a long period of time, such as a year and more preferably several years. The non-activated device in FIG. 14a has the redox monomer uniformly distributed in the electrolyte, whereas in activated state as shown in FIG. 14b a new coating is formed in selected portion of the indicator. Even if both of these devices were put to durability test under long periods of time or severe environmental conditions, such as several years of storage, elevated temperature test (e.g., 85 C for 10 days, preferably for 30 days), moist conditions (placing them in water or high humidity at 85% RH at 85 C for 10 days, preferably for 30 days) or subject them to UV under heat (e.g., subjecting labels to a test such as Society of Automotive Engineer's test method J1960 for 500 hours or preferably for 2,000 hours), the electrolyte containing the monomer (non-activated state) will degrade differently as compared to that area of the electrode where the colored polymer has been deposited (activated state). The monomer and the polymer are different materials, and further since the polymer is conjugated and localized, the visual perception of the indicator after the above testing will still be different in these samples which are in these two states (i.e., after testing, one can still tell them apart). This is based on expectation that the optical properties during testing change for labels in both states but the change is differential and not the same for both. This sort of permanence or durability to preserve the intended state of the indicator is important in many applications.

Preferred redox monomers are those which upon electrically activated polymerization result in the formation of conductive polymers. Once this polymer layer is formed, and since it is electronically conductive (e.g., polythiophene), one may apply a reverse potential, typically of a smaller magnitude to oxidize or reduce the formed polymer so that its optical state 2 can be changed again to an optical state 3. In some cases if the polarity is reversed, the optical state of the polymer is also reversed from optical state 3 to optical state 2. Thus this device can combine a unique character of a non-reversible change from an optical state 1 to an optical state 2 followed by a reversible change between optical state 2 to optical state 3. Since a new layer of material is formed due to an irreversible change, this also results in changes in resistance/impedance of the device. This change can be used to electronically probe or verify the state of the device, i.e., if it is in optical state 1 or a different optical state. One may also this type of system to make a device where an electrolyte layer is laminated between two substrates each having a conductive layer (to serve as the electrode). In this case at least one of the substrates and the conductors is transparent and uses three layers (two conductive electrodes and one electrolyte layer). When the device is powered or activated, the contrast changing material is deposited on one of those electrodes which is transparent.

The electrolyte may also comprise of other materials such as solubilizing medium (high boiling point electrolytic solvents, ionic liquids, etc.), ion conductive salt (dissociable lithium and/or sodium salts), additional redox materials (complimentary redox materials which may or may not polymerize, but facilitate the polymerization of the redox material by undergoing redox activity at the opposing electrode, e.g., viologen salts to be used as complimentary materials for thiophenes polymerizing at the anode, or additional complimentary redox layers), matrix forming polymers (polymers providing a solid form to the electrolytes, or those monomers which polymerize/crosslink during processing to form these solid electrolytes), UV stabilizers and absorbers, viscostity/thixotropy control additives, colorants, opacifiers, adhesion promotion agents, etc. A particularly preferred embodiment is to use hydrophobic ionic liquids in the electrolyte to impart low moisture sensitivity to the devices. Details on many of these ingredients, are listed in US patent application number 20110096388, the disclosure of which is included herein by reference.

Examples of EC Indicators

Example 1: Preparation of an EC Indicator with Opaque Electrolyte

Unless mentioned, all chemicals were obtained from Sigma-Aldrich (Milwaukee, Wis.). To a sure seal bottle fitted with a stir bar was added the PMMA (0.3 g, 15,000 molecular weight), acetonitrile (0.733 ml) and hydrophobic ionic liquid (0.49 g of 1-Butyl-1-methylpyrrolidinium bis (trifluoromethylsulfonyl)imide from Iolitec, Germany). The bottle was sealed and stirred at room temperature for two hours to form a slightly opaque colorless liquid. The bottle was transferred to a argon filled glove box and the 2,2' bithiophene (redox monomer, 0.041 g) and lithium imide (0.14 g of Fluorad HQ115salt from 3M, St. Paul, Minn.) was added. The bottle was sealed and stirred for one hour to form a solution. To this solution was added the fumed silica (0.33 g) and $TiO_2$ (0.3 g R996 obtained from DuPont, Wilmington, Del.) powders and the mixture stirred overnight. This resulted in a white liquid with a viscosity slightly higher than water (free flowing). Viscosity of the electrolyte was measured at 25° C. using a Brookfield Model DV-III+ programmable viscometer (Middleboro, Mass. 02346). The viscometer was calibrated using silicone oil standards. The electrolyte viscosity at a shear rate of 960 s-1 was 35 centipoise. These viscosities are suitable for pad printing, and one could decrease the solvent and/or increase fumed silica content to make more viscous electrolytes suitable for screen printing. Use of titanium dioxide imparted opacity to the electrolyte.

A drop of this electrolyte was placed on an ITO substrate and heated at 50° C. for fifteen minutes. The electrolyte turned to a bright white solid with a tacky consistency which adhered well to ITO.

This was made into a laminate cell using ITO/PET (surface resistivity of ITO was 50 Ω/sq) as the top and bottom electrodes. A white tape with a circular cavity (~5 mm in diameter and 110 to 120 μm in thickness) was placed on one of the electrodes to act as a template for the electrolyte. A drop of electrolyte was placed in the template and left at room temperature for ten minutes and then placed in an oven at 50° C. for fifteen minutes to remove the volatile solvent. Upon removal from the oven it was left to stand under ambient atmosphere for ten minutes and then a strip of ITO was placed on top (ITO side facing electrolyte). The sides of this device were encapsulated with an aluminum backed pressure sensitive adhesive tape. The color of the as fabricated device was almost white (optical state 1)

The device (display cell or indicator) was activated by applying 4 volts for 20 seconds. This produced a deep blue (almost black in appearance) dot (–optical state 2). This color change occurred due to the polymerization of the monomer (the redox material) from the electrolyte which deposited as a polymer on the positively charged electrode. This activation added an additional layer between the electrolyte and the transparent electrode where the colored layer was formed.

A second cell was activated by applying 4 volts for 20 seconds which also produced a deep blue (almost black) dot. After the formation of the blue/black dot, the potential was reversed, while the applied potential was also reduced to 1.2 volts. The blue color changed within 2 seconds to a deep red color—optical state 3. This color change occurred due to the electrochemical reduction of the polymer formed in the earlier activation step.

Further three different devices were made, first one of which was activated using 4V so that only blue color was seen, the second was activated to blue state and then to red state, and the third one was left without activation (white state). All of the three devices were stored in these states at –18 C, room temperature and at 58° C. for one month. After one month at any of these temperatures no visible change in color was seen in all three devices. This shows that all of these optical states were stable. Further, the first device could be activated to red state by applying 1.2V as described earlier. The red color device could be changed to a blue colored device by applying 1.2V so that the polymer oxidized, and the white colored device could be activated to blue state and then to red state by applying the potentials as discussed above. This shows that the device has multiple stable colored states, i.e., optical state 2 and optical state 3. The device could not be changed back to optical state 1—the change from this state was not reversible.

Example 2: Preparation of an EC Indicator with Clear Electrolyte

Figure 15:
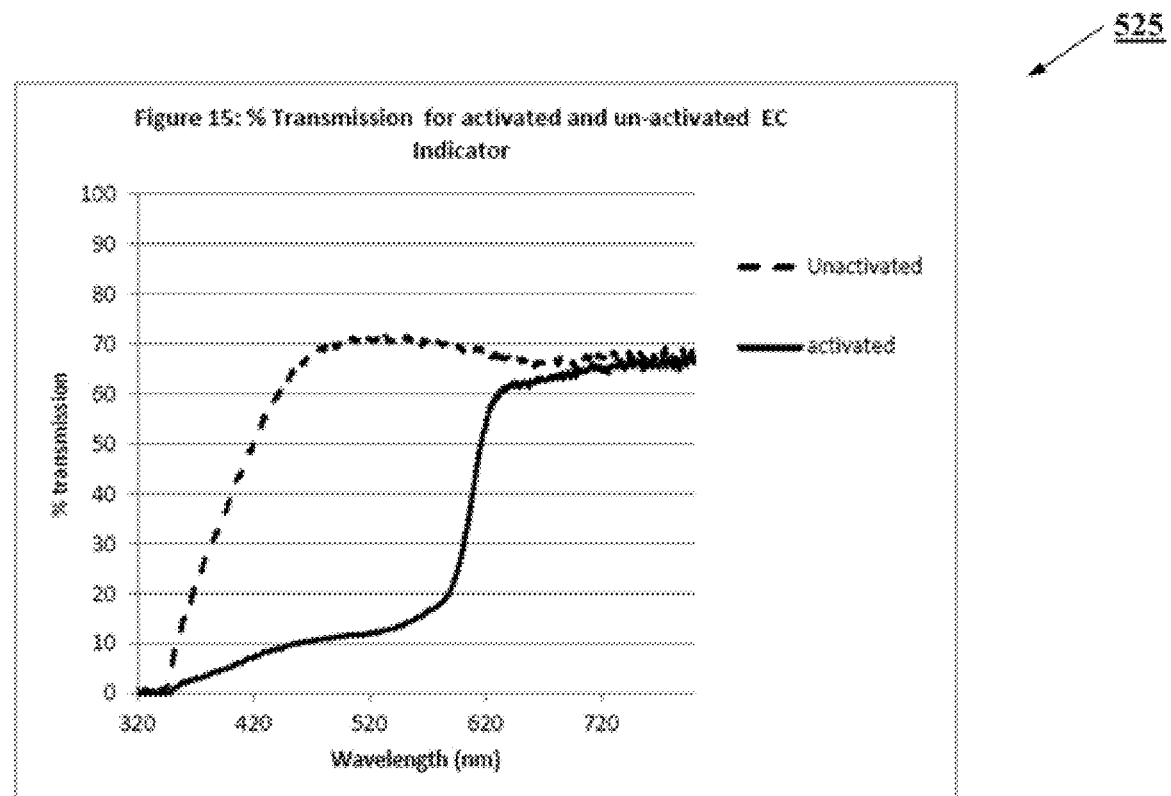
FIG. 15 is a chart illustrating the spectrum of light transmission through an EC indicator in its two reversible states in accordance with the present invention.

To a small sure seal bottle was added 0.3 g of PMMA (15,000 average molecular weight) and 0.733 ml of acetonitrile and ionic liquid (0.49 g of 1-Butyl-1-methylpyrrolidinium bis(trifluoromethylsulfonyl)imide. This was sealed and stirred for one hour to form a solution. To this was added 0.15 g of PMMA to give a total of 0.45 g of polymer. The mixture was stirred for two hours to form a solution. 0.033 g of fumed silica was added and again stirred for one hour. The bottle was placed in a fume hood under an argon atmosphere and 2-2' bithiophene (0.041 g) and the lithium salt [HQ-115, Lithium Bis(trifluoromethanesulfonyl)imide, 0.14 g] were added. The flask was sealed and stirred for one hour to form a light green solution which after stirring for 24 hours turned dark green. Its viscosity was 87 centipoise, measured using Brookfield Model DV-III+ programmable viscometer at a shear strain of 960 s-1. This electrolyte was used made to make a cell as described above, but with a different electrode configuration. An ITO electrode was used at the top and an ITO or a metal electrode at the bottom. ITO electrode was a transparent conductive ITO coated on PET as described above. The metallic electrodes were copper or stainless steel. Seal tape was placed at the edges of the substrates. When both of the electrodes were ITO the devices were transparent. The devices were activated to a blue state by applying 4 volts for 20 seconds (turned deep dark blue) and a subsequent reversed polarity with a potential of 1.2 volts was applied to turn the active area of the device deep red in color. A transmission spectrum of the device in the un-activated state (as prepared) and activated state (red) was taken between 320 and 800 nm. The spectra 525 are shown in FIG. 15.

Cells which were prepared where copper and or stainless steel (SS) were powered so that the bithiophene monomer polymerizes into a colored blue polymer to form a film on the metallic electrode. When the potential was reversed as above, the polymer turned into a red color which provided high contrast as compared to the initial metallic state.

Example 3: EC Indicator with Opposing Interdigitated Electrodes on the Same Substrate A transparent electrolyte was prepared by mixing 0.45 g of PMMA (15K MW), 0.033 g of fumed silica and 0.563 g of anhydrous acetonitrile. The mixture was stirred at 25° C. for two hours to form a translucent solution. Under an inert atmosphere was added 0.041 g of 2,2' bithiophene, 0.014 g of lithium bis(trifluoromethanesulfonyl)imide and 0.8 g of 1methyl-1butylpyrrolidinum bis(trifluoromethanesulfonyl) imide. The mixture after stirring for two hours had a light green color.

Figure 16:
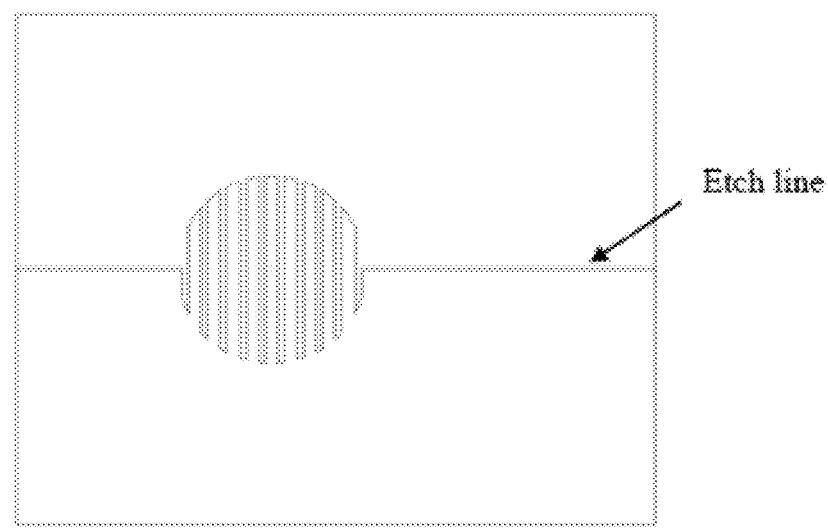
FIG. 16 is a picture of an EC indicator in nonactivated and the activated states in accordance with the present invention.

A device was fabricated as described in Example 2 except that a patterned ITO electrode was used. The pattern was made using a laser etching process. In this process the ITO was etched from the substrate using an IR laser, where the width of the etched (or ablated) line was in the range of 30 to 50 microns. One could have also used UV or visible region lasers with etched widths down to less than 10 microns. A schematic drawing 535 of the etched pattern is shown in FIG. 16. The figure shows a rectangular piece of PET substrate with an ITO coating (outer perimeter of the device). The line running through the center and zig-zagging is the laser etch path, essentially dividing the sample in two conductive areas without any electrical connection between the two. The width of the laser etch is not shown, as the line represents this etch. This figure shows that the fingers of this interdigitated design connected to the top are thinner as compared to the fingers connected to the bottom part. This design is asymmetric, and one could have also used a symmetric design. Any width of the fingers may be used, but a preferred width of the fingers for visual indicators using interdigitated design is in the range of 50 to 1,000 microns. The voltage is applied across the two opposing electrodes, i.e., in this case connecting the two polarities of the power source to the ITO on the top part and on the bottom part. Both of these opposing electrodes are on the same plane. One may also generate alphanumeric characters and images using interdigitated design of the electrodes. This pattern is an embodiment of the concept discussed earlier in FIG. 9.

Figure 17:
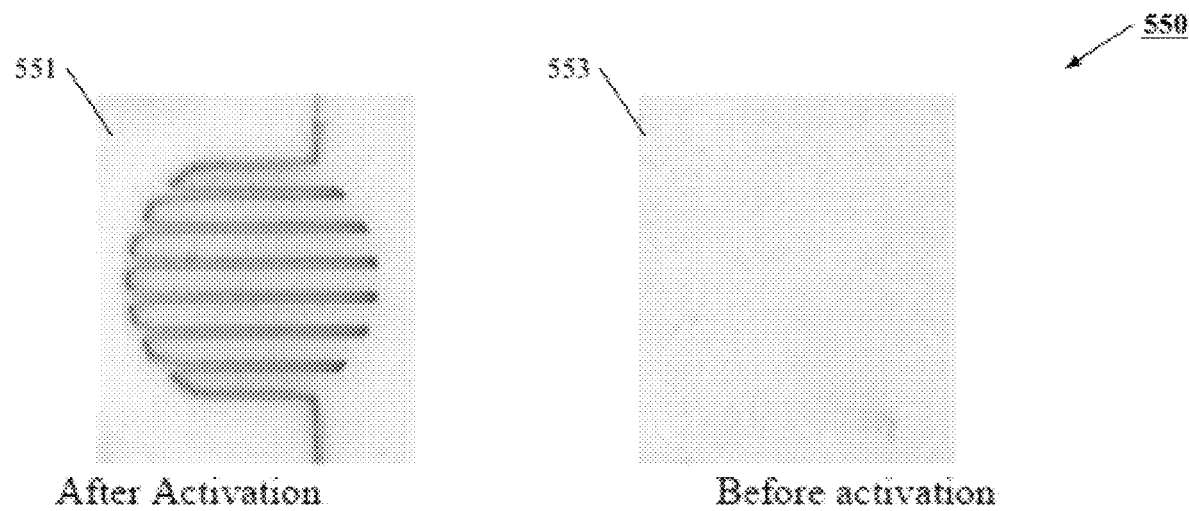
FIG. 17 is a picture of an EC interdigitated indicator in nonactivated and the activated states in accordance with the present invention.

This electrode contained isolated ITO interdigitated fingers which acted as anode and cathode electrodes (opposing electrodes). The electrolyte was placed on the on the substrate uniformly in an area covering slightly bigger than the area shown by the circle (touching both electrodes) formed by this etched pattern. The electrolyte layer was not patterned. A asymmetric electrode design was used where one set of fingers were about 250 microns wide and the other set was 500 microns wide. The electrolyte was cured at 50° C. for 15 minutes to give a final thickness of around 110 µm. In the as formed state the cell was colorless. Applying 3.3 volts the cell turned blue with the blue color following the pattern of the ITO. When a reverse potential of 1.2 volts was applied the cell turned red. This demonstrates that a colorless and colored transparent device can be prepared using both of the electrodes on a single substrate. FIG. 17 shows a device 550 prior to 551 and after 553 activation. Devices made in this fashion were stored under ambient conditions in both activated and non-activated states. These devices appeared unchanged to the eye after storing them for five years.

Figure 18:
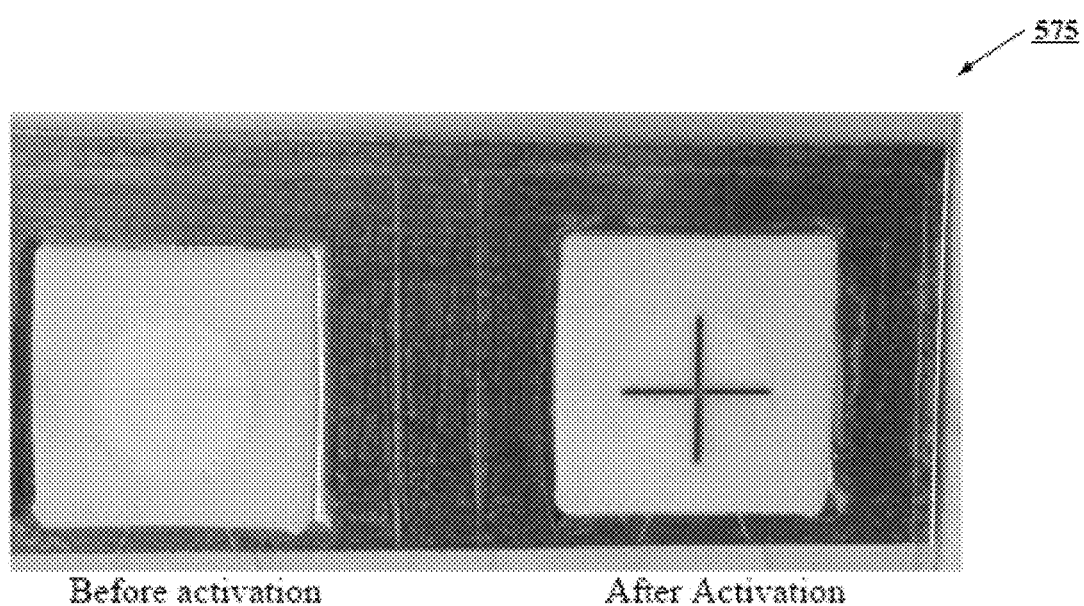
FIG. 18 is a picture of an EC indicator of a character symbol in nonactivated and the activated states in accordance with the present invention.

FIG. 18 shows another device 575 in the activated and non-activated state. In this case ITO was etched using a mechanical scribe in order to form this character. The length of the line forming the "+" sign was 10 mm. The size or the width of the mechanically etched lines was about 100 microns. The color of lines shown in the activated state was red-ochre for both FIGS. 17 and 18.

While particular preferred and alternative embodiments of the present intention have been disclosed, it will be appreciated that many various modifications and extensions of the above described technology may be implemented using the teaching of this invention. All such modifications and extensions are intended to be included within the true spirit and scope of the appended claims.

What is claimed is:

1. An intelligent label, comprising:
   a processor capable of using conditional information;
   an actuator operably connected to the processor, the actuator arranged to activate electronics in the label;
   a multi-stable indicator capable of being transitioned from a first visual state to a second or third visual state;
   a power source; and
   wherein, responsive to the conditional information, the processor applies a power signal to the multi-stable indicator to transition the multi-stable indicator to the second or third visual state and wherein at least one of the second or third visual states of the multi-stable indicator is electrically irreversible.

2. The intelligent label according to claim 1, wherein the conditional information further comprises conditional rules, and according to the conditional rules the processor applies the power signal to the multi-stable indicator.

3. The intelligent label according to claim 2, wherein the conditional information further comprises conditional variables, and responsive to a change in one or more conditional variables, the processor applies the power signal to the multi-stable indicator.

4. The intelligent label according to claim 1, further including a sensor, and a conditional signal from the sensor changes the conditional information.

5. The intelligent label according to claim 4, wherein the sensor is a temperature sensor, a humidity sensor, a vibration sensor, a mechanical force sensor, a strain sensor, a chemical sensor, a biological sensor, a gas sensor, a pH sensor, a magnetic sensor, an optical sensor, a smoke sensor, a pressure sensor, an altitude sensor, or a shock sensor.

6. The intelligent label according to claim 1, further including a timer, clock, or elapse timer that generate a conditional signal, and the conditional signal changes the conditional information.

7. The intelligent label according to claim 1, further including a wireless receiver.

8. The intelligent label according to claim 7, wherein the wireless receiver is configured to activate electrical functions responsive in the intelligent label to receiving a wireless signal.

9. The intelligent label according to claim 7, whereby, a conditional signal from the wireless receiver changes the conditional information.

10. The intelligent label according to claim 1, further including a wired interface.

11. The intelligent label according to claim 10, wherein the wired interface activates electrical electronic functions in the intelligent label, responsive to receiving an electrical signal.

12. The intelligent label according to claim 10, whereby, a conditional signal from the wired interface changes the conditional information.

13. The intelligent label according to claim 1, wherein, responsive to the conditional information, the processor applies a power signal to the multi-stable indicator to transition the multi-stable indicator from the second visual state to the third visual state.

14. The intelligent label according to claim 1, wherein, responsive to the conditional information, the processor applies a power signal to the multi-stable indicator to transition the multi-stable indicator from the third visual state to the second visual state.

15. The intelligent label according to claim 1, wherein at least one of the second or third visual states of the multi-stable indicator are electrically irreversible and permanent.

16. The intelligent label according to claim 1, wherein a transition between the second visual state and third visual state includes changing the polarity of the power signal.

17. The intelligent label according to claim 1, wherein a transition between the second visual state and third visual state includes changing the voltage of the power signal.

18. The intelligent label according to claim 1, wherein the actuator is configured to activate one or more electrical functions within the intelligent label.

19. The intelligent label according to claim 1, further comprising a second actuator.

20. The intelligent label of claim 19 wherein the actuators are configured to activate different electrical functions, or the same electrical functions at different times.

21. The intelligent label according to claim 1, wherein the conditional information is date information, time information, or elapsed time information, or duration information.

22. The intelligent label according to claim 1, further comprising a sensor and wherein the conditional information is sensor information, the sensor information altering the conditions under which the visual states are transitioned.

23. The intelligent label according to claim 1, further comprising an optical receiver wherein the optical receiver activates electrical functions in the intelligent label responsive to receiving an optical signal.

24. The intelligent label according to claim 1, wherein the actuator is an adhesive backing and circuitry configured to activate electrical functions when removed from the intelligent label.

25. The intelligent label according to claim 1, wherein the actuator is activated by closing an electrical circuit to generate an activation signal.

26. The intelligent label according to claim 1, wherein the actuator is activated by creating a break in an electrical circuit to generate an activation signal.

27. The intelligent label according to claim 1, wherein the actuator is activated by pressure.

28. The intelligent label according to claim 1, wherein manipulating the actuator generates an electrical signal that functions as an activation signal.

29. The intelligent label according to claim 1, further comprising a wireless radio.

30. The intelligent label according to claim 29, where the wireless radio is arranged to allow an external device to set or access data from the intelligent label.

31. The intelligent label according to claim 29, where the wireless radio is arranged to transmit data from the intelligent label.

32. The intelligent label according to claim 1, wherein the power source includes one or more internal or external power sources.

33. The intelligent label according to claim 32, wherein an internal power source is a battery, a thermopile, a thin-film device, or a capacitor.

34. The intelligent label according to claim 1, further comprising a memory storing the conditional information.

35. An intelligent label, comprising:
   a processor capable of using conditional information;
   an electro-optic multi-stable indicator capable of being transitioned from a first visual state to a second or third visual state, the second or third visual state being electronically irreversible;
   a power source; and
   wherein, responsive to the conditional information, the processor applies a power signal to the multi-stable indicator to transition the multi-stable indicator to the second or third visual state.

36. The intelligent label according to claim 35, wherein, responsive to the conditional information, the processor applies a power signal to the multi-stable indicator to transition the multi-stable indicator from the second visual state to the third visual state.

37. The intelligent label according to claim 35, wherein, responsive to the conditional information, the processor applies a power signal to the multi-stable indicator to transition the multi-stable indicator from the third visual state to the second visual state.

38. The intelligent label according to claim 35, further comprising a wireless radio.

39. The intelligent label according to claim 35, further comprising a sensor.

40. The intelligent label according to claim 35, wherein the sensor is a temperature sensor, a humidity sensor, a vibration sensor, a mechanical force sensor, a strain sensor, a chemical sensor, a biological sensor, a gas sensor, a pH sensor, a magnetic sensor, an optical sensor, a smoke sensor, a pressure sensor, an altitude sensor, or a shock sensor.

41. The intelligent label according to claim 35, further comprising an actuator.

42. The intelligent label according to claim 35, further comprising a memory storing the conditional information.

43. An intelligent label, comprising:
- a processor capable of using conditional information;
- an electronic multi-stable indicator capable of being transitioned from a first visual state to a second or third visual state, the second or third visual state being permanent;
- a wireless radio;
- a power source; and
- wherein, responsive to the conditional information, the processor applies a power signal to the multi-stable indicator to transition the multi-stable indicator to the second or third visual state.

44. The intelligent label according to claim 43, wherein, responsive to the conditional information, the processor applies a power signal to the multi-stable indicator to transition the multi-stable indicator from the second visual state to the third visual state.

45. The intelligent label according to claim 43, wherein, responsive to the conditional information, the processor applies a power signal to the multi-stable indicator to transition the multi-stable indicator from the third visual state to the second visual state.

46. The intelligent label according to claim 43, further comprising a sensor.

47. The intelligent label according to claim 43, further comprising an actuator.

48. The intelligent label according to claim 43, further comprising a memory storing the conditional information.

* * * * *